United States Patent
Saito

(10) Patent No.: US 12,478,275 B2
(45) Date of Patent: Nov. 25, 2025

(54) DETECTION DEVICE

(71) Applicant: Magnolia White Corporation, Tokyo (JP)

(72) Inventor: Hitoshi Saito, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 736 days.

(21) Appl. No.: 17/854,267

(22) Filed: Jun. 30, 2022

(65) Prior Publication Data

US 2023/0011192 A1    Jan. 12, 2023

(30) Foreign Application Priority Data

Jul. 12, 2021   (JP) .................................. 2021-115056

(51) Int. Cl.
*A61B 5/024*   (2006.01)
*A61B 5/00*    (2006.01)
*A61B 5/1455*  (2006.01)

(52) U.S. Cl.
CPC ...... *A61B 5/02433* (2013.01); *A61B 5/14552* (2013.01); *A61B 5/6826* (2013.01)

(58) Field of Classification Search
CPC . A61B 5/1455; A61B 5/14552; A61B 5/6826; A61B 5/6824; A61B 5/02433
See application file for complete search history.

(56) References Cited

U.S. PATENT DOCUMENTS

| | | | |
|---|---|---|---|
| 2006/0122520 A1* | 6/2006 | Banet | A61B 5/14552 600/323 |
| 2008/0019218 A1 | 1/2008 | Klopfenstein et al. | |
| 2016/0249839 A1* | 9/2016 | Wong | A61B 5/14552 600/323 |
| 2017/0079535 A1 | 3/2017 | Tchertkov et al. | |
| 2018/0325397 A1 | 11/2018 | Presura et al. | |
| 2019/0231201 A1 | 8/2019 | Kano | |
| 2021/0326623 A1 | 10/2021 | Kato et al. | |

FOREIGN PATENT DOCUMENTS

| | | |
|---|---|---|
| JP | 2005-071317 A | 3/2005 |
| JP | 2008-023341 A | 2/2008 |
| JP | 2018-531668 A | 11/2018 |
| JP | 2018-536521 A | 12/2018 |
| JP | 2019-134089 A | 8/2019 |
| WO | WO2015/159693 A1 | 10/2015 |
| WO | WO2020/137129 A1 | 7/2020 |

OTHER PUBLICATIONS

Office Action issued in related Japanese Patent Application No. 2021-115056, mailed on Oct. 22, 2024 and English translation of same. 12 pages.

* cited by examiner

*Primary Examiner* — Eric F Winakur
(74) *Attorney, Agent, or Firm* — K&L Gates LLP

(57) ABSTRACT

A detection device includes an annular substrate, optical sensors annularly arranged along the substrate, and a plurality of light sources annularly arranged correspondingly to the arrangement of the optical sensors.

16 Claims, 15 Drawing Sheets

FIG.12

| SEQUENCE | LIGHT SOURCE TO BE LIT | ACTIVE AREA | | |
|---|---|---|---|---|
| | | EXAMPLE 1 | EXAMPLE 2 | EXAMPLE 3 |
| 1 | 0° | AA | AA1 | AA5 |
| 2 | 45° | | AA2 | AA6 |
| 3 | 90° | | AA3 | AA7 |
| 4 | 135° | | AA4 | AA8 |
| 5 | 180° | | AA5 | AA1 |
| 6 | 225° | | AA6 | AA2 |
| 7 | 270° | | AA7 | AA3 |
| 8 | 315° | | AA8 | AA4 |

FIG.15

| TYPE OF POSITION DETERMINATION ARITHMETIC PROCESSING | DETAILS OF PROCESSING |
|---|---|
| STANDARD DEVIATION | EMPLOY POSITION WHERE STANDARD DEVIATION OF PULSE RATES MEASURED PLURALITY OF TIMES IS SMALLEST AS LATER SENSING POSITION |
| MEAN VALUE | EMPLOY POSITION WHERE "MEAN VALUE OF PULSE RATES" IS CLOSEST TO "MEAN VALUE OF PULSE RATES AT ALL LOCATIONS" AS LATER SENSING POSITION |
| DIFFERENCE BETWEEN MINIMUM AND MAXIMUM VALUES | EMPLOY POSITION WHERE DIFFERENCE BETWEEN MINIMUM AND MAXIMUM VALUES OF PULSE RATES MEASURED PLURALITY OF TIMES IS SMALLEST AS LATER SENSING POSITION |

FIG.16

| ANGLE | MEASUREMENT RESULTS (10 TIMES MEASUREMENTS IN 1 SECOND) | | | | | | | | | | ACTUAL PULSE RATE | MEAN VALUE | STANDARD DEVIATION | DIFFERENCE BETWEEN MAXIMUM AND MINIMUM VALUES |
|---|---|---|---|---|---|---|---|---|---|---|---|---|---|---|
| 0° | 91 | 89 | 89 | 89 | 89 | 89 | 88 | 86 | 90 | 88 | 85 | 88.8 | 1.249 | 5 |
| 45° | 92 | 92 | 92 | 90 | 94 | 89 | 87 | 82 | 80 | 80 | 87 | 87.8 | 5.03587 | 14 |
| 90° | 56 | 54 | 53 | 53 | 58 | 66 | 81 | 80 | 80 | 79 | 83 | 66 | 11.9666 | 28 |
| 135° | 66 | 86 | 73 | 78 | 75 | 84 | 80 | 81 | 80 | 80 | 81 | 78.3 | 5.45985 | 18 |
| 180° | 73 | 64 | 73 | 82 | 80 | 82 | 82 | 83 | 84 | 80 | 92 | 78.3 | 6.01747 | 20 |
| 225° | 64 | 75 | 69 | 61 | 67 | 56 | 67 | 78 | 88 | 84 | 85 | 70.9 | 9.65867 | 27 |
| 270° | 87 | 85 | 81 | 81 | 81 | 85 | 85 | 86 | 87 | 88 | 82 | 84.5 | 2.53969 | 7 |
| 315° | 88 | 88 | 84 | 83 | 83 | 79 | 79 | 79 | 80 | 81 | 82 | 82.4 | 3.29242 | 9 |

DETECTION DEVICE

CROSS-REFERENCE TO RELATED APPLICATION

This application claims the benefit of priority from Japanese Patent Application No. 2021-115056 filed on Jul. 12, 2021, the entire contents of which are incorporated herein by reference.

BACKGROUND

1. Technical Field

The present disclosure relates to a detection device.

2. Description of the Related Art

Detection devices that measure pulse rates using photoplethysmography are known (for example, International Application Publication No. WO2015/159693).

In a detection device that detects an object, such as a human finger, having an outer periphery forming a circle as a subject of detection of a pulse rate, a sensor is brought into contact with a portion of an arc formed by the circle, and most part of the arc other than the portion is surrounded by an elastic member such as a leaf spring so as to be press the sensor to the portion. In such a conventional detection device, the position of contact of the sensor may be misaligned from a desired position for acquiring the pulse rate. When such a positional misalignment occurs, the conventional detection device is difficult to perform sensing.

The present disclosure has been made in view of the problem described above, and it is an object thereof to provide a detection device capable of performing sensing better.

SUMMARY

A detection device according to an embodiment of the present disclosure includes an annular substrate, optical sensors annularly arranged along the substrate, and a plurality of light sources annularly arranged correspondingly to the arrangement of the optical sensors.

BRIEF DESCRIPTION OF THE DRAWINGS

FIG. 12 is a chart illustrating examples of operation modes employable in the embodiment;

FIG. 15 is a chart illustrating types of position determination arithmetic processing and details of each of the types of the processing; and FIG. 16 is a chart illustrating, as a table, an exemplary relation among measurement results of pulse rates (for 10 times) at each of angles of 0°, 45°, 90°, 135°, 180°, 225°, 270°, and 315°, an actual pulse rate at each of the angles, the mean result of the measurement results (for 10 times) of the pulse rates, and the standard deviation of the measurement results (for 10 times) of the pulse rates.

DETAILED DESCRIPTION

Figure 1:
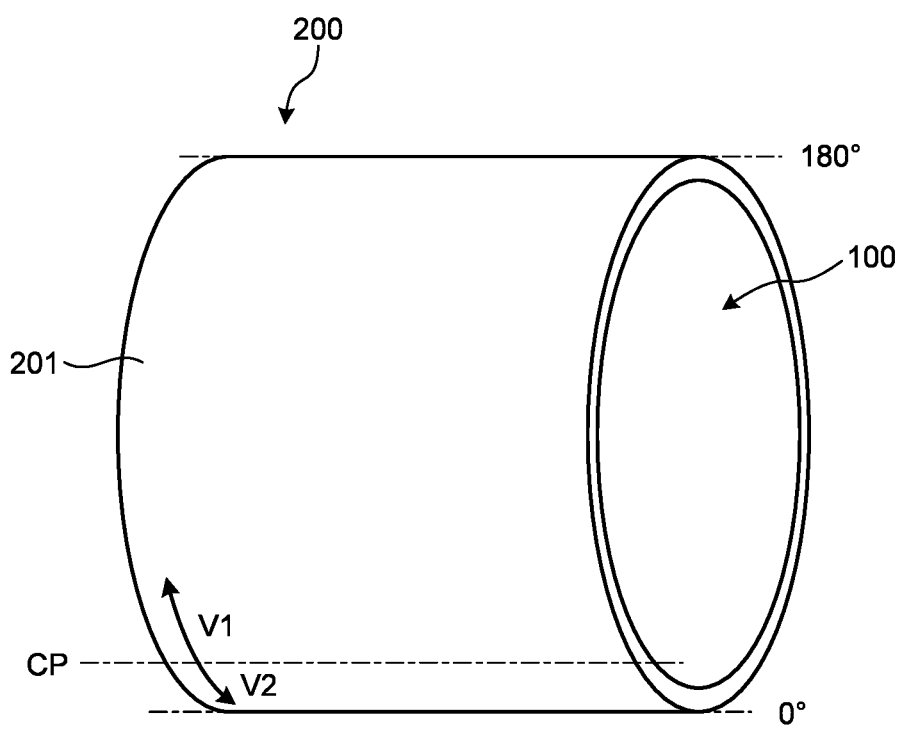
FIG. 1 is schematic view of a device 200 according to an embodiment of the present disclosure.

The following describes a mode (embodiment) for carrying out the present invention in detail with reference to the drawings. The present invention is not limited to the description of the embodiment given below. Components described below include those easily conceivable by those skilled in the art or those substantially identical thereto. In addition, the components described below can be combined as appropriate. What is disclosed herein is merely an example, and the present invention naturally encompasses appropriate modifications easily conceivable by those skilled in the art while maintaining the gist of the invention. To further clarify the description, the drawings may schematically illustrate, for example, widths, thicknesses, and shapes of various parts as compared with actual aspects thereof. However, they are merely examples, and interpretation of the present invention is not limited thereto. The same component as that described with reference to an already mentioned drawing is denoted by the same reference numeral through the description and the drawings, and detailed description thereof may not be repeated where appropriate.

FIG. 1 is a schematic view of a device 200 according to an embodiment of the present disclosure. The device 200 includes a columnar housing 201 and a detection device 100 provided in the housing 201. The housing 201 is a tubular member of a resin, a cloth, a metal, an alloy, or a metallic compound intended to be used as, for example, a finger ring or a wristband of a human. In the following description, the housing 201 is assumed to be a rigid cylindrical synthetic resin intended to be used as a finger ring.

Figure 2:
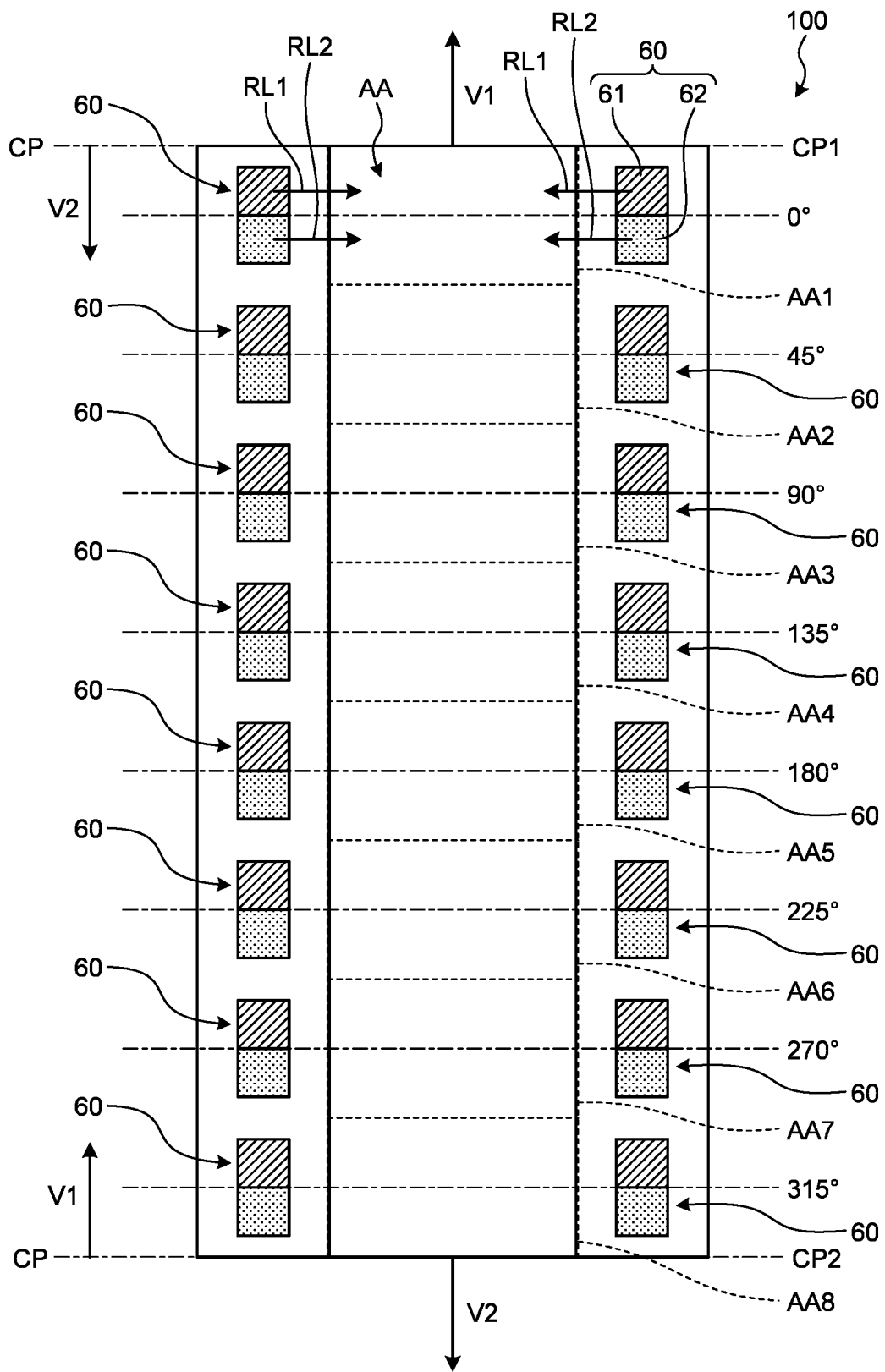
FIG. 2 is a schematic diagram illustrating a configuration of a detection device.
Figure 3:
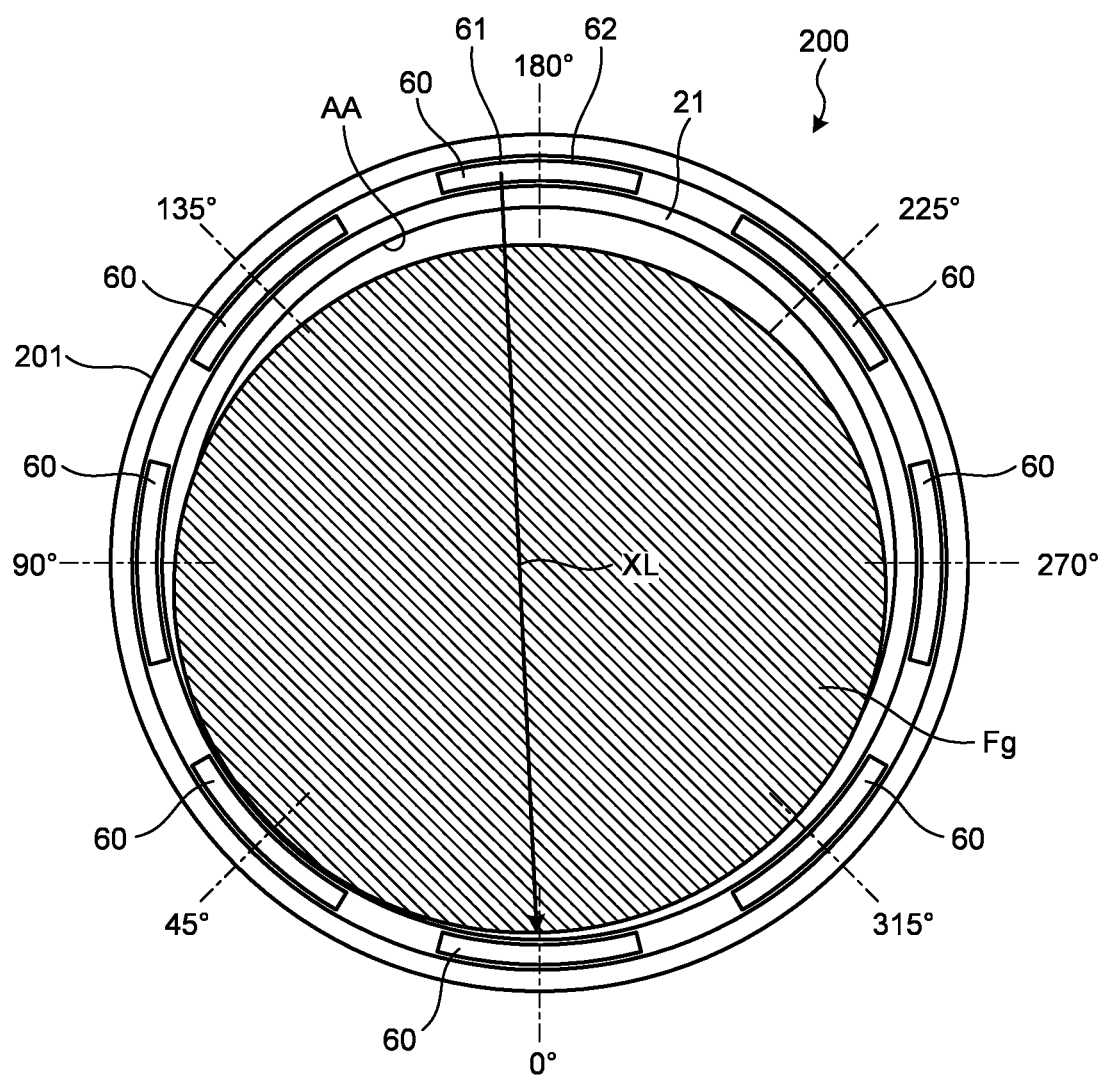
FIG. 3 is a schematic view illustrating a component arrangement example when the device accommodating therein a subject of detection is viewed from one end side of a tube.

FIG. 2 is a schematic diagram illustrating a configuration of the detection device 100. FIG. 3 is a schematic view illustrating a component arrangement example when the device 200 accommodating therein a finger Fg is viewed from one end side of the tube. As illustrated in FIG. 2, the detection device 100 includes a sensor substrate 21, photodiodes PD (refer to FIG. 7) provided in a detection area AA described later, and a plurality of light sources 60.

As illustrated in FIG. 3, the detection area AA is provided on an inner peripheral surface of the tube of the device 200. The detection area AA contacts a component (such as the finger Fg illustrated in FIG. 3) accommodated in the device 200. More specifically, the detection area AA is provided such that a connecting portion CP1 on one end side of the detection area AA illustrated in FIG. 2 is connected to a connecting portion CP2 on the other end side of the detection area AA. The detection area AA thereby forms a ring so as to continue through 360° along a ring formed by the inner peripheral surface of the tubular device 200 illustrated in FIG. 1.

The description with reference to FIGS. 1 and 2 assumes that the connecting portions CP1 and CP2 illustrated in FIG. 2 contacts each other in a position of a connecting portion CP illustrated in FIG. 1, and thus, the detection area AA is provided so as to form the ring. A direction from the connecting portion CP illustrated in FIG. 1 toward one side along the ring formed by the inner peripheral surface of the tube of the device 200 is referred to as a first direction V1, and a direction along the ring toward the other side is referred to as a second direction V2. In FIGS. 1, 2, and 3, a position at 0° in the ring and a position at 180° in the ring are defined to distinguish each portion of the ring formed by the detection area AA. FIGS. 2 and 3 further indicates the positions at 45°, 90°, 135°, 225°, 270°, and 315° separated at intervals of 45° between the position at 0° and the position at 180°.

In FIG. 2, long dashed short dashed lines indicate the positions at 0°, 45°, 90°, 135°, 180°, 225°, 270°, and 315° from the connecting portion CP toward the second direction V2 side. In FIG. 2, partial areas AA1, AA2, AA3, AA4, AA5, AA6, AA7, and AA8 of the detection area AA centered in the positions at 0°, 45°, 90°, 135°, 180°, 225°, 270°, and 315° are indicated as dashed line areas and formed as rectangular. The partial area AA1 is an area covering a range of ±22.5° centered at 0°. The partial area AA2 is an area covering a range of ±22.5° centered at 45°. The partial area AA3 is an area covering a range of ±22.5° centered at 90°. The partial area AA4 is an area covering a range of ±22.5° centered at 135°. The partial area AA5 is an area covering a range of ±22.5° centered at 180°. The partial area AA6 is an area covering a range of ±22.5° centered at 225°. The partial area AA7 is an area covering a range of ±22.5° centered at 270°. The partial area AA8 is an area covering a range of ±22.5° centered at 315°. As a base material of a sensor area 10 (refer to FIG. 4) that constitutes the detection area AA serving as the partial areas AA1, AA2, AA3, AA4, AA5, AA6, AA7, and AA8, the sensor substrate 21 is provided so as to form a ring along the inner peripheral surface of the housing 201, as illustrated in FIG. 3.

As illustrated in FIG. 2, two of the light sources 60 are provided so as to face each other with a corresponding one of the partial areas AA1, AA2, AA3, AA4, AA5, AA6, AA7, and AA8 interposed therebetween. One of the two of the light sources 60 is located at one end side of the tube formed by the device 200 with respect to the detection area AA. The other of the two of the light sources 60 is located at the other end side of the tube formed by the device 200 with respect to detection area AA. Accordingly, as illustrated in FIG. 3, when the device 200 is viewed from the one end side, eight of the light sources 60 are arranged along the ring formed by the inner peripheral surface of the device 200. The light sources 60 included in the eight of the light sources 60 are arranged at intervals of 45°. Although not illustrated in the drawings, when the device 200 is viewed from the other end side, the eight of the light sources 60 are arranged along the ring formed by the inner peripheral surface of the device 200, in the same manner.

Each of the light sources 60 includes a first light source 61 and a second light source 62. Accordingly, two of the first light sources 61 are provided so as to face each other with a corresponding one of the partial areas AA1, AA2, AA3, AA4, AA5, AA6, AA7, and AA8 interposed therebetween. Also, two of the second light sources 62 are provided so as to face each other with a corresponding one of the partial areas AA1, AA2, AA3, AA4, AA5, AA6, AA7, and AA8 interposed therebetween. The first light source 61 is located on the first direction V1 side of the second light source 62 in the ring formed by the inner peripheral surface of the device 200. The second light source 62 is located on the second direction V2 side of the first light source 61 in the ring formed by the inner peripheral surface of the device 200. As illustrated in FIG. 2, a boundary line between the first and the second light sources 61 and 62 included in each of the light sources 60 overlaps any one of the long dashed short dashed lines indicating 0°, 45°, 90°, 135°, 180°, 225°, 270°, and 315°. Light XL illustrated in FIG. 3 is light (such as infrared light) that has been emitted from the first light source 61 and transmitted through the finger Fg.

The following describes a detection unit 1 constituting the detection device 100, with reference to FIGS. 4 to 11.

Figure 4:
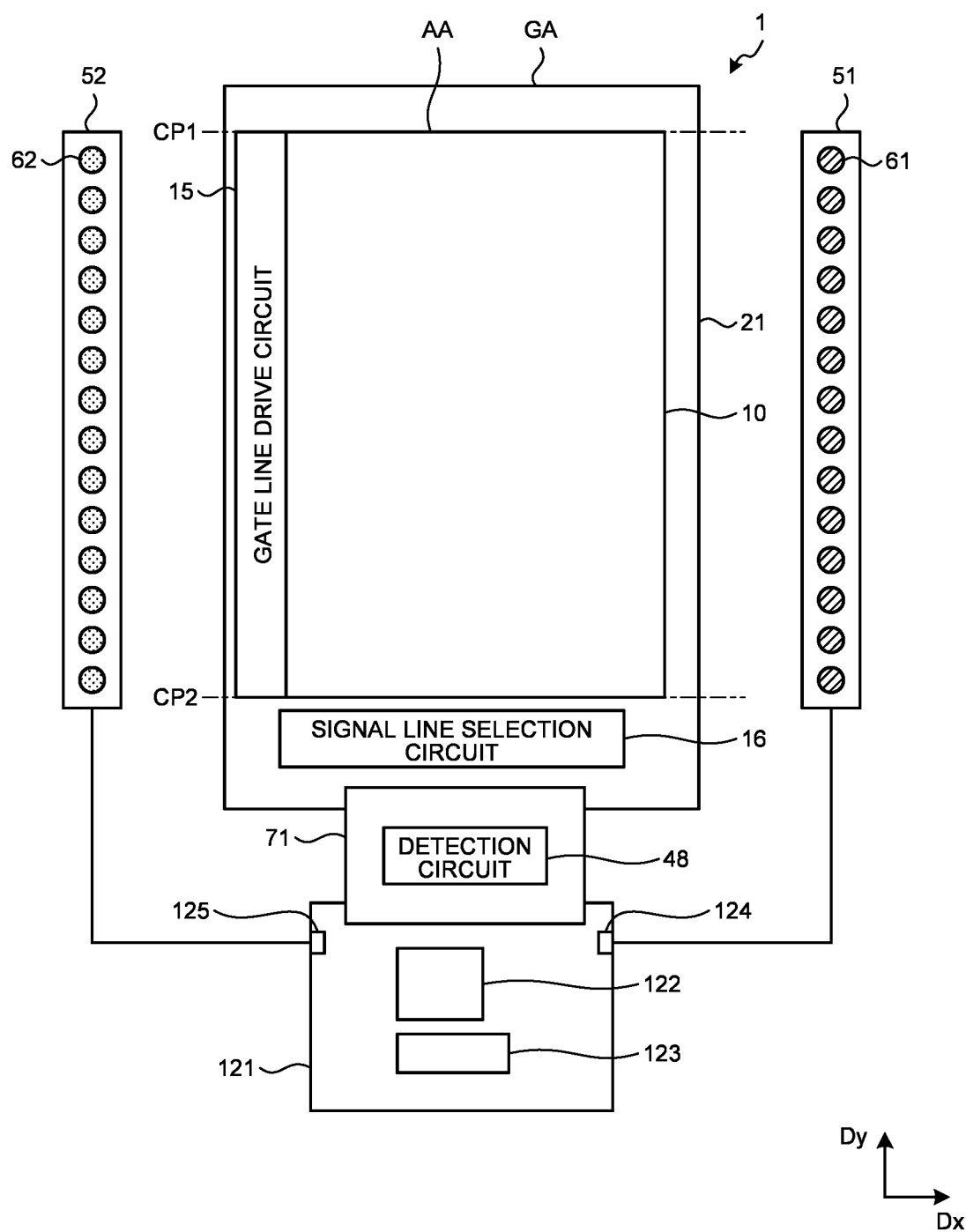
FIG. 4 is a plan view illustrating the detection device according to the embodiment.

FIG. 4 is a plan view illustrating the detection device according to the embodiment. As illustrated in FIG. 4, the detection unit 1 includes the sensor substrate 21, the sensor area 10, a gate line drive circuit 15, a signal line selection circuit 16, a detection circuit 48, a control circuit 122, a power supply circuit 123, a first light source base material 51, a second light source base material 52, the first light sources 61, and the second light sources 62.

The sensor substrate 21 is electrically coupled to a control substrate 121 through a flexible printed circuit board 71. The flexible printed circuit board 71 is provided with the detection circuit 48. The control substrate 121 is provided with the control circuit 122 and the power supply circuit 123. The control circuit 122 is, for example, a field-programmable gate array (FPGA). The control circuit 122 supplies control signals to the sensor area 10, the gate line drive circuit 15, and the signal line selection circuit 16 to control a detection operation of the sensor area 10. The control circuit 122 supplies control signals to the first and the second light sources 61 and 62 to control lighting or non-lighting of the first and the second light sources 61 and 62. The power supply circuit 123 supplies voltage signals including, for example, a sensor power supply signal VDDSNS (refer to FIG. 7) to the sensor area 10, the gate line drive circuit 15, and the signal line selection circuit 16. The power supply circuit 123 supplies a power supply voltage to the first and the second light sources 61 and 62.

The sensor substrate 21 has the detection area AA and a peripheral area GA. The detection area AA is an area provided with the photodiodes PD (refer to FIG. 7) included in the sensor area 10. The peripheral area GA is an area between the outer perimeter of the detection area AA and ends of the sensor substrate 21, and is an area not overlapping the photodiodes PD.

A position overlapping one of the four sides of the detection area AA that form a boundary between the rectangular detection area AA and the peripheral area GA serves as the connecting portion CP1 illustrated in FIG. 2. A position overlapping another of the four sides of the detection area AA that faces the one side with the detection area AA interposed therebetween serves as the connecting portion CP2 illustrated in FIG. 2.

The gate line drive circuit 15 and the signal line selection circuit 16 are provided in the peripheral area GA. Specifically, the gate line drive circuit 15 is provided in an area extending along a second direction Dy in the peripheral area GA. The signal line selection circuit 16 is provided in an area extending along a first direction Dx in the peripheral area GA, and is provided between the sensor area 10 and the detection circuit 48.

The first direction Dx is one direction in a plane parallel to the sensor substrate 21. The second direction Dy is one direction in the plane parallel to the sensor substrate 21, and is a direction orthogonal to the first direction Dx. The second direction Dy may non-orthogonally intersect the first direction Dx. A third direction Dz is a direction orthogonal to the first direction Dx and the second direction Dy, and is a direction normal to the sensor substrate 21.

The first light sources 61 are provided on the first light source base material 51, and are arranged along the second direction Dy. The second light sources 62 are provided on the second light source base material 52, and are arranged along the second direction Dy. The first light source base material 51 and the second light source base material 52 are electrically coupled, through terminals 124 and 125, respectively, provided on the control substrate 121, to the control circuit 122 and the power supply circuit 123.

For example, inorganic light-emitting diodes (LEDs) or organic electroluminescence (EL) devices (organic light-emitting diodes: OLEDs) are used as the first and the second light sources 61 and 62. The first and the second light sources 61 and 62 emit first light and second light, respectively, having different wavelengths. That is, the first light has a first maximum emission wavelength, and the second light has a second maximum emission wavelength different from the first maximum emission wavelength. The term "maximum emission wavelength" refers to a wavelength that exhibits a maximum emission intensity in an emission spectrum representing a relation between the wavelength and the emission intensity of each of the first light and the second light.

As one example, the first light has the first maximum emission wavelength of from 520 nm to 600 nm, or, approximately 500 nm, and the second light has the second maximum emission wavelength of from 600 nm to 700 nm, for example, approximately 660 nm. That is, the second maximum emission wavelength of the second light is larger than the first maximum emission wavelength of the first light. In this case, the first light and the second light are visible light. The first light is blue or green light, and the second light is red light.

The first light emitted from the first light source 61 is reflected on a surface of an object to be detected such as the finger Fg or the like, and is incident on the sensor area 10. As a result, the sensor area 10 can detect a fingerprint by detecting a shape of asperities on the surface of the finger Fg or the like. The second light emitted from the second light source 62 is reflected in the finger Fg or the like, or transmitted through the finger Fg or the like, and is incident on the sensor area 10. As a result, the sensor area 10 can detect information on a living body in the finger Fg or the like. Examples of the information on the living body include the pulse rate of the finger Fg or a palm.

The wavelengths of the first and the second light are not limited to the examples described above, and can be changed as appropriate. For example, the first light may have the first maximum emission wavelength of from 520 nm to 600 nm, or, approximately 500 nm, and the second light may have the second maximum emission wavelength of from 780 nm to 900 nm, for example, approximately 850 nm. In this case, the first light is blue or green visible light, and the second light is infrared light. The sensor area 10 can detect the fingerprint based on the first light emitted from the first light source 61. The second light emitted from the second light source 62 is reflected in the object to be detected such as the finger Fg or the like, or transmitted through the finger Fg or the like, and is incident on the sensor area 10. As a result, the sensor area 10 can detect a vascular image (vein pattern) as the information on the living body in the finger Fg or the like.

Alternatively, the first light may have the first maximum emission wavelength of from 600 nm to 700 nm, for example, approximately 660 nm, and the second light may have the second maximum emission wavelength of from 780 nm to 900 nm, for example, approximately 850 nm. In this case, the sensor area 10 can detect a blood oxygen level in addition to the pulse rate and the vascular image as the information on the living body based on the first light emitted from the first light source 61 and the second light emitted from the second light source 62. As described above, the detection unit 1 includes the first and the second light sources 61 and 62, and therefore, can detect the various types of information on the living body by performing the detection based on the first light and the detection based on the second light.

The arrangement of the first and the second light sources 61 and 62 illustrated in FIG. 4 is merely an example, and may be changed as appropriate. For example, the first and the second light sources 61 and 62 may be arranged on each of the first and the second light source base materials 51 and 52. In this case, a group including the first light sources 61 and a group including the second light sources 62 may be arranged side by side in the second direction Dy, or the first and the second light sources 61 and 62 may be arranged alternately in the second direction Dy. The first and the second light sources 61 and 62 may be provided on one light source base material, or three or more light source base materials.

Figure 5:
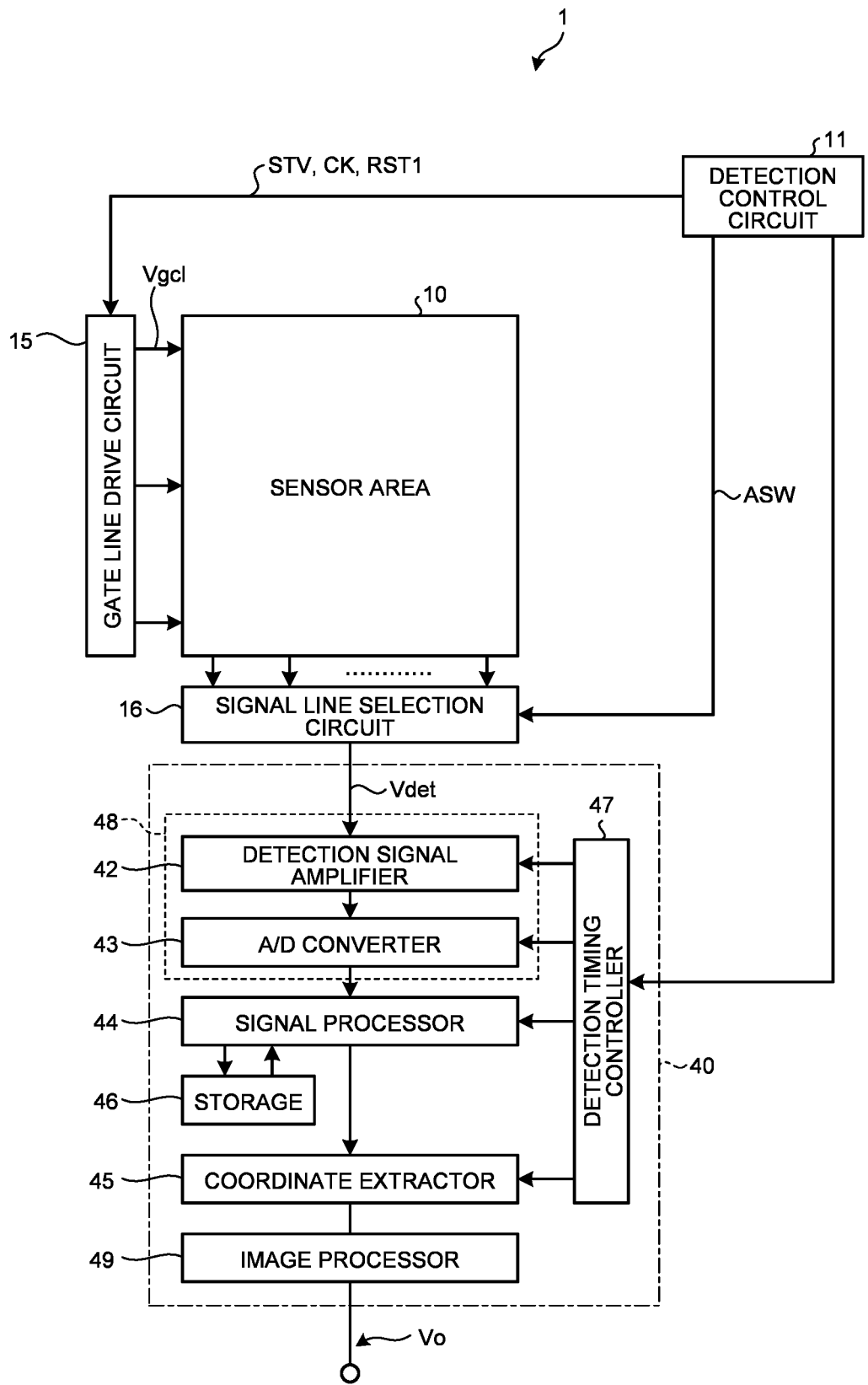
FIG. 5 is a block diagram illustrating a configuration example of the detection device according to the embodiment.

FIG. 5 is a block diagram illustrating a configuration example of the detection unit 1 according to the embodiment. As illustrated in FIG. 5, the detection unit 1 further includes a detection control circuit 11 and a detector 40. The control circuit 122 includes one, some, or all of the functions of the detection control circuit 11. The control circuit 122 also includes one, some, or all of the functions of the detector 40 except those of the detection circuit 48.

The sensor area 10 is an optical sensor that includes the photodiodes PD serving as photoelectric conversion elements. Each of the photodiodes PD included in the sensor area 10 outputs an electrical signal corresponding to light irradiating the photodiode PD as a detection signal Vdet to the signal line selection circuit 16. The sensor area 10 performs the detection in response to a gate drive signal Vgcl supplied from the gate line drive circuit 15.

The detection control circuit 11 is a circuit that supplies respective control signals to the gate line drive circuit 15, the signal line selection circuit 16, and the detector 40 to control operations thereof. The detection control circuit 11 supplies various control signals such as a start signal STV, a clock signal CK, and a reset signal RST1 to the gate line drive circuit 15. The detection control circuit 11 also supplies various control signals such as a selection signal ASW to the signal line selection circuit 16. The detection control circuit 11 supplies various control signals to the first and the second light sources 61 and 62 to control the lighting and non-lighting of the respective first and second light sources 61 and 62.

The gate line drive circuit 15 is a circuit that drives a plurality of gate lines GCL (refer to FIG. 6) based on the various control signals. The gate line drive circuit 15 sequentially or simultaneously selects the gate lines GCL, and supplies the gate drive signals Vgcl to the selected gate lines GCL. Through this operation, the gate line drive circuit 15 selects the photodiodes PD coupled to the gate lines GCL.

Figure 6:
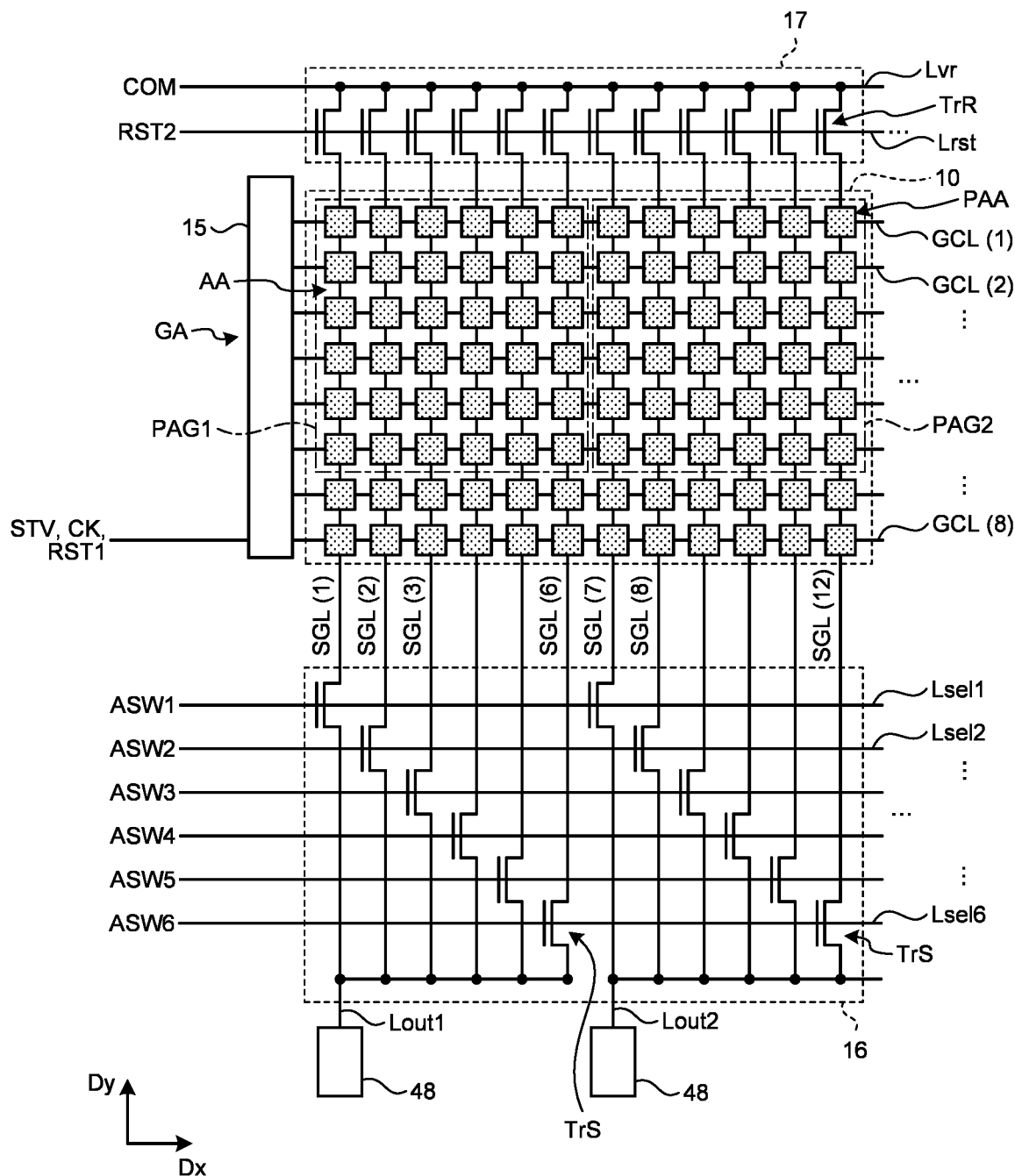
FIG. 6 is a circuit diagram illustrating the detection device.

The signal line selection circuit 16 is a switch circuit that sequentially or simultaneously selects a plurality of signal lines SGL (refer to FIG. 6). The signal line selection circuit 16 is, for example, a multiplexer. The signal line selection circuit 16 couples the selected signal lines SGL to the detection circuit 48 based on the selection signal ASW supplied from the detection control circuit 11. Through this operation, the signal line selection circuit 16 outputs the detection signals Vdet of the photodiodes PD to the detector 40.

The detector 40 includes the detection circuit 48, a signal processor 44, a coordinate extractor 45, a storage 46, a detection timing controller 47, and an image processor 49. Based on a control signal supplied from the detection control circuit 11, the detection timing controller 47 controls the detection circuit 48, the signal processor 44, the coordinate extractor 45, and the image processor 49 so as to operate in synchronization with one another.

The detection circuit 48 is, for example, an analog front-end (AFE) circuit. The detection circuit 48 is a signal processing circuit having functions of at least a detection signal amplifier 42 and an analog-to-digital (A/D) converter 43. The detection signal amplifier 42 amplifies the detection signals Vdet. The A/D converter 43 converts analog signals output from the detection signal amplifier 42 into digital signals.

The signal processor 44 is a logic circuit that detects a predetermined physical quantity received by the sensor area 10 based on an output signal of the detection circuit 48. The signal processor 44 can detect the asperities on the surface of the finger Fg or the palm based on the signals from the detection circuit 48 when the finger Fg is in contact with or in proximity to a detection surface. The signal processor 44 can also detect the information on the living body based on the signal from the detection circuit 48. Examples of the information on the living body include the vascular image, a pulse wave, the pulse rate, and the blood oxygen level of the finger Fg or the palm.

The signal processor 44 may also perform processing of acquiring the detection signals Vdet (information on the living body) simultaneously detected by the photodiodes PD, and averaging the detection signals Vdet. In this case, the detector 40 can perform stable detection by reducing measurement errors caused by noise and/or relative positional misalignment between the object to be detected, such as the finger Fg, and the sensor area 10.

The storage 46 temporarily stores therein a signal calculated by the signal processor 44. The storage 46 may be, for example, a random-access memory (RAM) or a register circuit.

The coordinate extractor 45 is a logic circuit that obtains detected coordinates of the asperities on the surface of the finger or the like when the contact or the proximity of the finger is detected by the signal processor 44. The coordinate extractor 45 is also a logic circuit that obtains detected coordinates of blood vessels of the finger Fg or the palm. The image processor 49 combines the detection signals Vdet output from the respective photodiodes PD of the sensor area 10 to generate two-dimensional information representing the shape of the asperities on the surface of the finger Fg or the like and two-dimensional information representing the shape of the blood vessels of the finger Fg or the palm. The coordinate extractor 45 may output the detection signals Vdet as sensor outputs Vo instead of calculating the detected coordinates. A case can be considered where the detector 40 does not include the coordinate extractor 45 and the image processor 49.

Figure 7:
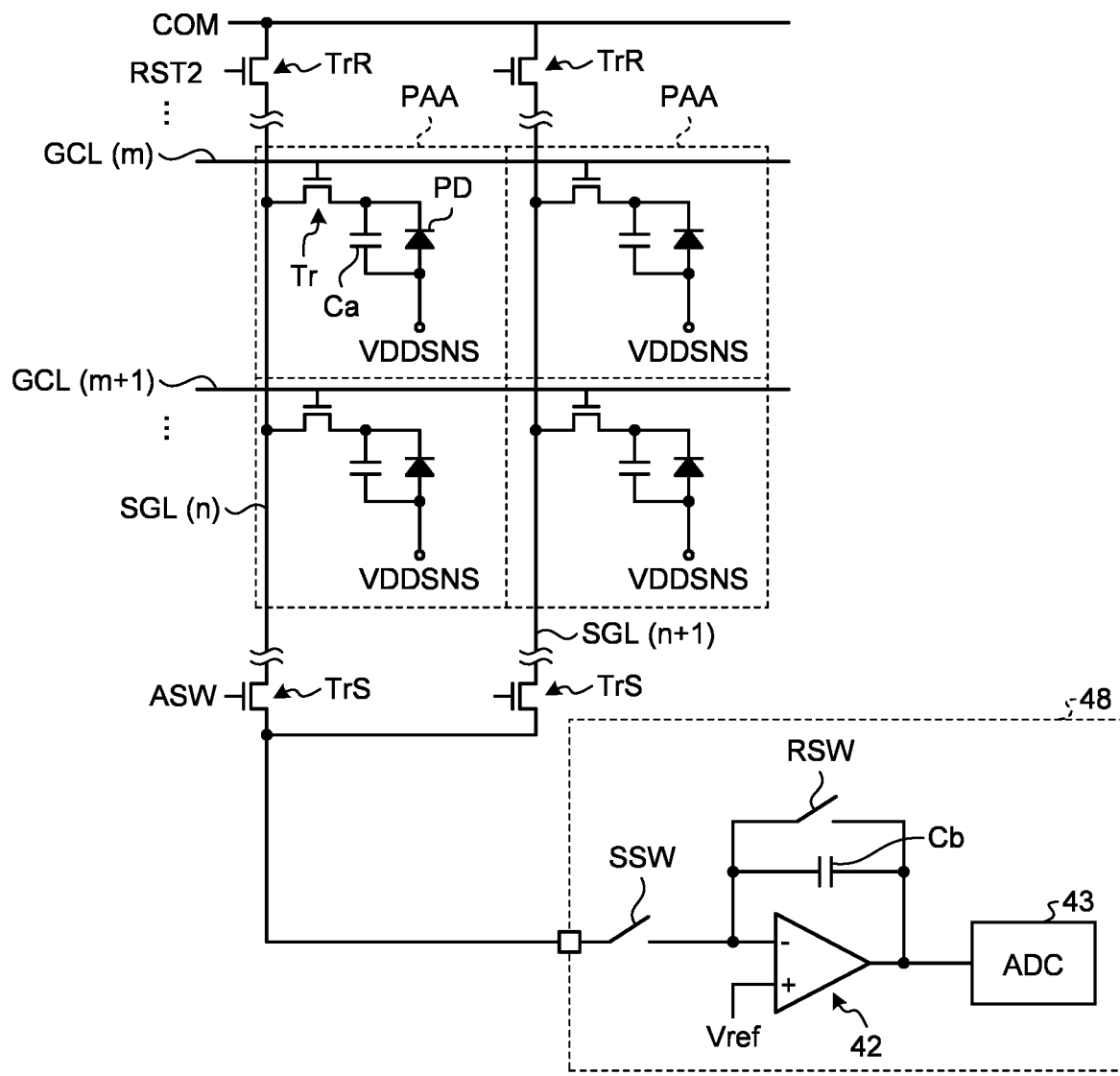
FIG. 7 is a circuit diagram illustrating a plurality of partial detection areas.

The following describes a circuit configuration example of the detection unit 1. FIG. 6 is a circuit diagram illustrating the detection unit 1. FIG. 7 is a circuit diagram illustrating the partial detection areas. FIG. 7 also illustrates a circuit configuration of the detection circuit 48.

As illustrated in FIG. 6, the sensor area 10 has a plurality of partial detection areas PAA arranged in a matrix having a row-column configuration. Each of the partial detection areas PAA is provided with the photodiode PD.

The gate lines GCL extend in the first direction Dx, and are coupled to the partial detection areas PAA arranged in the first direction Dx. A plurality of gate lines GCL(1), GCL(2), . . . , GCL(8) are arranged in the second direction Dy, and are each coupled to the gate line drive circuit 15. In the following description, the gate lines GCL(1), GCL(2), . . . , GCL(8) will each be simply referred to as the gate line GCL when need not be distinguished from one another. For ease of understanding of the description, FIG. 6 illustrates eight of the gate lines GCL. However, this is merely an example, and M (where M is eight or larger, and is, for example, 256) of the gate lines GCL may be arranged.

The signal lines SGL extend in the second direction Dy, and are coupled to the photodiodes PD of the partial detection areas PAA arranged in the second direction Dy. A plurality of signal lines SGL(1), SGL(2), . . . , SGL(12) are arranged in the first direction Dx, and are each coupled to the signal line selection circuit 16 and a reset circuit 17. In the following description, the signal lines SGL(1), SGL(2), . . . , SGL(12) will each be simply referred to as the signal line SGL when need not be distinguished from one another.

For ease of understanding of the description, 12 of the signal lines SGL are illustrated. However, this is merely an example, and N (where N is 12 or larger, and is, for example, 252) of the signal lines SGL may be arranged. In FIG. 6, the sensor area 10 is provided between the signal line selection circuit 16 and the reset circuit 17. The present disclosure is not limited thereto. The signal line selection circuit 16 and the reset circuit 17 may be coupled to ends in the same direction of the signal lines SGL.

The gate line drive circuit 15 receives the various control signals such as the start signal STV, the clock signal CK, and the reset signal RST1 from the control circuit 122 (refer to FIG. 5). The gate line drive circuit 15 sequentially selects the gate lines GCL(1), GCL(2), . . . , GCL(8) in a time-division manner based on the various control signals. The gate line drive circuit 15 supplies the gate drive signal Vgcl to the selected one of the gate lines GCL. This operation supplies the gate drive signal Vgcl to a plurality of first switching elements Tr coupled to the gate line GCL, and corresponding ones of the partial detection areas PAA arranged in the first direction Dx are selected as detection targets.

The gate line drive circuit 15 may perform different driving for each of detection modes including the detection of the fingerprint and the detection of different items of the information on the living body (such as the pulse wave, the pulse rate, the vascular image, and the blood oxygen level). For example, the gate line drive circuit 15 may drive the gate lines GCL in a bundle.

Specifically, the gate line drive circuit 15 simultaneously selects a predetermined number of the gate lines GCL from among the gate lines GCL(1), GCL(2), . . . , GCL(8) based on the control signals. For example, the gate line drive circuit 15 simultaneously selects six of the gate lines GCL(1) to GCL(6), and supplies thereto the gate drive signals Vgcl. The gate line drive circuit 15 supplies the gate drive signals Vgcl through the selected six gate lines GCL to the first switching elements Tr. Through this operation, detection area groups PAG1 and PAG2 each including corresponding ones of the partial detection areas PAA arranged in the first direction Dx and the second direction Dy are selected as the respective detection targets. The gate line drive circuit 15 drives the predetermined number of the gate lines GCL in a bundle, and sequentially supplies the gate drive signals Vgcl to each unit of the predetermined number of the gate lines GCL.

The signal line selection circuit 16 includes a plurality of selection signal lines Lsel, a plurality of output signal lines Lout, and third switching elements TrS. The third switching elements TrS are provided correspondingly to the respective signal lines SGL. Six of the signal lines SGL(1), SGL(2), . . . , SGL(6) are coupled to a common output signal line Lout1. Six of the signal lines SGL(7), SGL(8), . . . , SGL(12) are coupled to a common output signal line Lout2. The output signal lines Lout1 and Lout2 are each coupled to the detection circuit 48.

The signal lines SGL(1), SGL(2), . . . , SGL(6) are grouped into a first signal line block, and the signal lines SGL(7), SGL(8), . . . , SGL(12) are grouped into a second signal line block. The selection signal lines Lsel are coupled to the gates of the respective third switching elements TrS included in one of the signal line blocks. One of the selection signal lines Lsel is coupled to the gates of the third switching elements TrS in the signal line blocks.

Specifically, selection signal lines Lsel1, Lsel2, . . . , Lsel6 are coupled to the third switching elements TrS corresponding to the signal lines SGL(1), SGL(2), . . . , SGL(6), respectively. The selection signal line Lsel1 is coupled to one of the third switching elements TrS corresponding to the signal line SGL(1) and one of the third switching elements TrS corresponding to the signal line SGL(7). The selection signal line Lsel2 is coupled to one of the third switching elements TrS corresponding to the signal line SGL(2) and one of the third switching elements TrS corresponding to the signal line SGL(8).

The control circuit 122 (refer to FIG. 4) sequentially supplies the selection signal ASW to the selection signal lines Lsel. This operation causes the signal line selection circuit 16 to operate the third switching elements TrS to sequentially select the signal lines SGL in one of the signal line blocks in a time-division manner. The signal line selection circuit 16 selects one of the signal lines SGL in each of the signal line blocks. With the above-described configuration, the detection unit 1 can reduce the number of integrated circuits (ICs) including the detection circuit 48 or the number of terminals of the ICs.

The signal line selection circuit 16 may couple a plurality of the signal lines SGL in a bundle to the detection circuit 48. Specifically, the control circuit 122 (refer to FIG. 4) simultaneously supplies the selection signal ASW to the selection signal lines Lsel. This operation causes the signal line selection circuit 16 to operate the third switching elements TrS to select the signal lines SGL (for example, six of the signal lines SGL) in one of the signal line blocks, and couple the signal lines SGL to the detection circuit 48. As a result, the signals detected in each of the detection area groups PAG1 and PAG2 are output to the detection circuit 48. In this case, the signals from the partial detection areas PAA (photodiodes PD) included in each of the detection area groups PAG1 and PAG2 are put together and output to the detection circuit 48.

Through the operations of the gate line drive circuit 15 and the signal line selection circuit 16, the detection is performed for each of the detection area groups PAG1 and PAG2. As a result, the intensity of the first detection signal Vdet obtained by a single detection operation increases, so that the sensor sensitivity can be improved. The time required for the detection can also be reduced. As a result, the detection unit 1 can repeatedly perform the detection in a short time, and thus, can improve a signal-to-noise (S/N) ratio, and can also accurately detect a temporal change in the information on the living body, such as the pulse wave.

As illustrated in FIG. 6, the reset circuit 17 includes a reference signal line Lvr, a reset signal line Lrst, and fourth switching elements TrR. The fourth switching elements TrR are provided correspondingly to the signal lines SGL. The reference signal line Lvr is coupled to either the sources or the drains of the fourth switching elements TrR. The reset signal line Lrst is coupled to the gates of the fourth switching elements TrR.

The control circuit 122 supplies a reset signal RST2 to the reset signal line Lrst. This operation turns on the fourth switching elements TrR to electrically couple the signal lines SGL to the reference signal line Lvr. The power supply circuit 123 supplies a reference signal COM to the reference signal line Lvr. This operation supplies the reference signal COM to a capacitive element Ca (refer to FIG. 7) included in each of the partial detection areas PAA.

As illustrated in FIG. 7, each of the partial detection areas PAA includes the photodiode PD, the capacitive element Ca, and a corresponding one of the first switching elements Tr. FIG. 7 illustrates two gate lines GCL(m) and GCL(m+1) arranged in the second direction Dy among the gate lines GCL. FIG. 4 also illustrates two signal lines SGL(n) and SGL(n+1) arranged in the first direction Dx among the signal lines SGL. The partial detection area PAA is an area surrounded by the gate lines GCL and the signal lines SGL. Each of the first switching elements Tr is provided correspondingly to the photodiode PD. The first switching element Tr is constituted by a thin-film transistor, and in this example, constituted by an n-channel metal oxide semiconductor (MOS) thin-film transistor (TFT).

The gates of the first switching elements Tr belonging to the partial detection areas PAA arranged in the first direction Dx are coupled to the gate line GCL. The sources of the first switching elements Tr belonging to the partial detection areas PAA arranged in the second direction Dy are coupled to the signal line SGL. The drain of the first switching element Tr is coupled to the cathode of the photodiode PD and the capacitive element Ca.

The anode of the photodiode PD is supplied with the sensor power supply signal VDDSNS from the power supply circuit 123. The signal line SGL and the capacitive element Ca are supplied with the reference signal COM that serves as an initial potential of the signal line SGL and the capacitive element Ca from the power supply circuit 123.

When the partial detection area PAA is irradiated with light, a current corresponding to the amount of the light flows through the photodiode PD. As a result, an electrical charge is stored in the capacitive element Ca. After the first switching element Tr is turned on, a current corresponding to the electrical charge stored in the capacitive element Ca flows through the signal line SGL. The signal line SGL is coupled to the detection circuit 48 through a corresponding one of the third switching elements TrS of the signal line selection circuit 16. Thus, the detection unit 1 can detect a signal corresponding to the amount of the light irradiating the photodiode PD in each of the partial detection areas PAA or each of the detection area groups PAG1 and PAG2.

During a reading period Pdet (refer to FIG. 10), a switch SSW of the detection circuit 48 is turned on, and the detection circuit 48 is coupled to the signal lines SGL. The detection signal amplifier 42 of the detection circuit 48 converts a variation of a current supplied from the signal lines SGL into a variation of a voltage, and amplifies the result. A reference voltage Vref having a fixed potential is supplied to a non-inverting input terminal (+) of the detection signal amplifier 42, and the signal lines SGL are coupled to an inverting input terminal (−) of the detection signal amplifier 42. In the present embodiment, the same signal as the reference signal COM is supplied as the reference voltage Vref. The detection signal amplifier 42 includes a capacitive element Cb and a reset switch RSW. During a reset period Prst (refer to FIG. 10), the reset switch RSW is turned on, and an electrical charge of the capacitive element Cb is reset.

Figure 8:
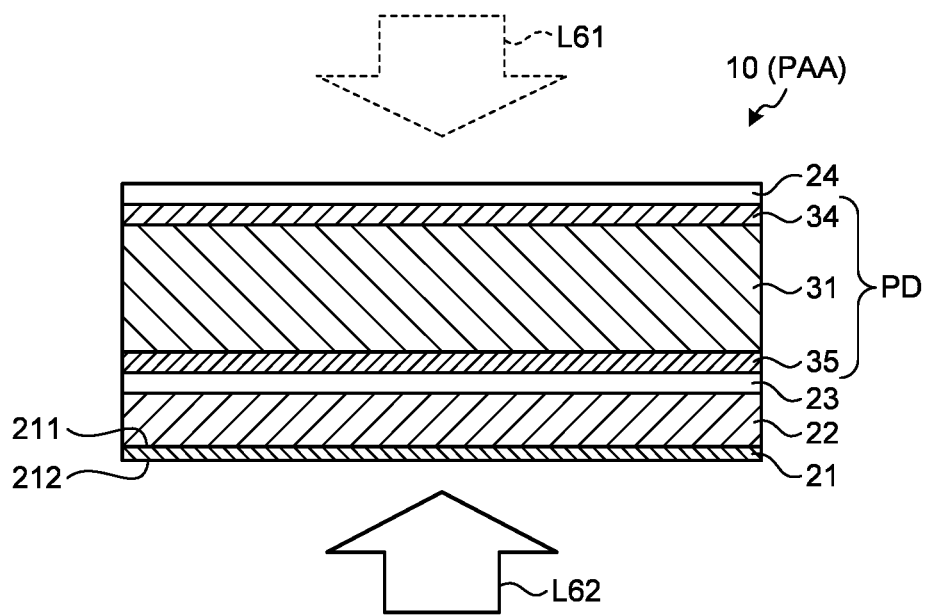
FIG. 8 is a sectional view illustrating a schematic sectional configuration of a sensor area.
Figure 9:
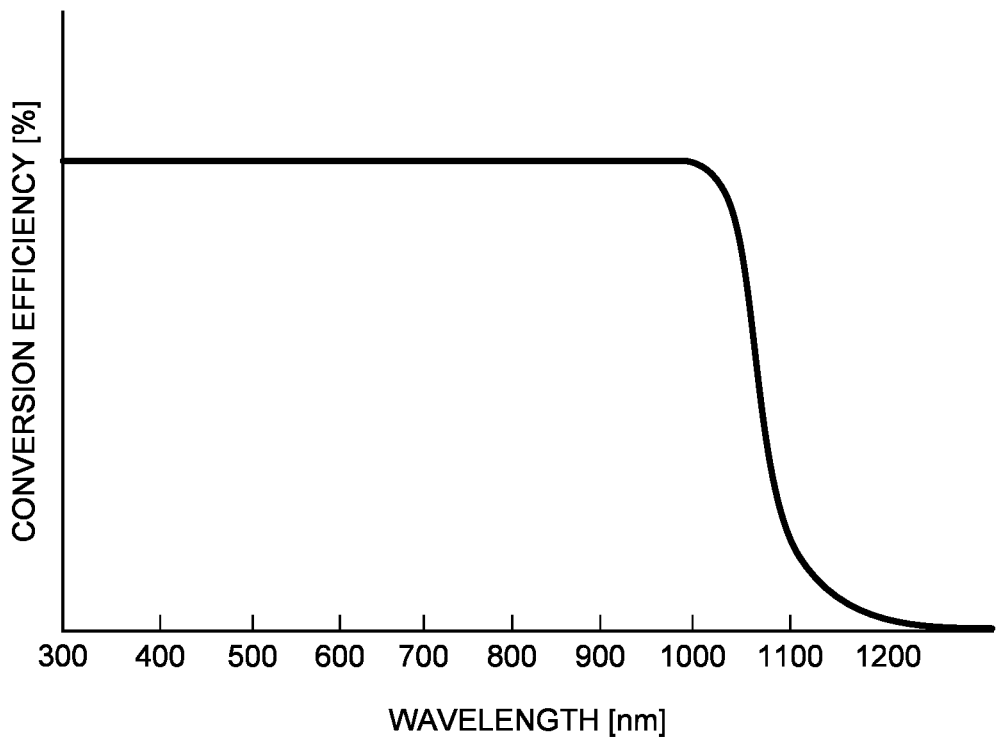
FIG. 9 is a graph schematically illustrating a relation between a wavelength and a conversion efficiency of light incident on a photodiode.

The following describes a configuration of the photodiode PD. FIG. 8 is a sectional view illustrating a schematic sectional configuration of the sensor area. FIG. 9 is a graph schematically illustrating a relation between the wavelength and a conversion efficiency of light incident on the photodiode.

As illustrated in FIG. 8, the sensor area 10 includes the sensor substrate 21, a TFT layer 22, an insulating layer 23, the photodiode PD, and a protective film 24. The sensor substrate 21 is a flexible insulating base material, and is a film-like resin, for example. The sensor substrate 21 has a first surface 211 and a second surface 212 on the opposite side of the first surface 211. The TFT layer 22, the insulating layer 23, the photodiode PD, and the protective film 24 are stacked in this order on the first surface 211.

The TFT layer 22 is provided with circuits such as the gate line drive circuit 15 and the signal line selection circuit 16 described above. The TFT layer 22 is also provided with TFTs, such as the first switching elements Tr, and various types of wiring such as the gate lines GCL and signal lines SGL. The sensor substrate 21 and the TFT layer 22 serve as a drive circuit board that drives the sensor for each predetermined detection area, and are also called a backplane.

The insulating layer 23 is an inorganic insulating film. For example, an oxide such as silicon oxide ($SiO_2$) or a nitride such as silicon nitride (SiN) is used as the insulating layer 23.

The photodiode PD is provided above the insulating layer 23. The photodiode PD includes a photoelectric conversion layer 31, a cathode electrode 35, and an anode electrode 34. The cathode electrode 35, the photoelectric conversion layer 31, and the anode electrode 34 are stacked in this order in a direction orthogonal to the first surface 211 of the sensor substrate 21. The stacking order in the photodiode PD may be as follows: the anode electrode 34, the photoelectric conversion layer 31, and the cathode electrode 35.

The photoelectric conversion layer 31 changes in characteristics (for example, voltage-current characteristics and a resistance value) according to light emitted thereto. An organic material is used as a material of the photoelectric conversion layer 31. Specifically, as the photoelectric conversion layer 31, low-molecular-weight organic materials can be used including, for example, fullerene ($C_{60}$), phenyl-C61-butyric acid methyl ester (PCBM), copper phthalocyanine (CuPc), fluorinated copper phthalocyanine ($F_{16}CuPc$), rubrene (5,6,11,12-tetraphenyltetracene), and PDI (a derivative of perylene).

The photoelectric conversion layer 31 can be formed by a vapor deposition process (dry process) using the above-listed low-molecular-weight organic materials In this case, the photoelectric conversion layer 31 may be, for example, a multilayered film of CuPc and $F_{16}CuPc$, or a multilayered film of rubrene and $C_{60}$. The photoelectric conversion layer 31 can also be formed by a coating process (wet process). In this case, the photoelectric conversion layer 31 is made using a material obtained by combining the above-listed low-molecular-weight organic materials with high-molecular-weight organic materials. As the high-molecular-weight organic materials, for example, poly(3-hexylthiophene) (P3HT) and F8-alt-benzothiadiazole (F8BT) can be used. The photoelectric conversion layer 31 can be a film in the state of a mixture of P3HT and PCBM or a film in the state of a mixture of F8BT and PDI.

The cathode electrode 35 faces the anode electrode 34 with the photoelectric conversion layer 31 interposed therebetween. A light-transmitting conductive material such as indium tin oxide (ITO) is used as the anode electrode 34. A metal material such as silver (Ag) or aluminum (Al) is used as the cathode electrode 35. Alternatively, the cathode electrode 35 may be an alloy material containing at least one or more of these metal materials.

The cathode electrode 35 can be formed as a light-transmitting transflective electrode by controlling the film thickness of the cathode electrode 35. For example, the cathode electrode 35 is formed of a Ag thin film having a film thickness of 10 nm so as to have light transmittance of approximately 60%. In this case, the photodiode PD can detect light emitted from both surface sides of the sensor substrate 21, that is, for example, both the first light emitted from the first surface 211 side and the second light emitted from the second surface 212 side.

The protective film 24 is provided so as to cover the anode electrode 34. The protective film 24 is a passivation film, and is provided to protect the photodiode PD.

FIG. 9 is the graph schematically illustrating the relation between the wavelength and the efficiency of the light incident on the photodiode. The horizontal axis of the graph illustrated in FIG. 9 represents the wavelength of the light incident on the photodiode PD, and the vertical axis of the graph represents the external quantum efficiency of the photodiode PD. The external quantum efficiency is expressed as a ratio between the number of photons of the light incident on the photodiode PD and a current that flows from the photodiode PD to the external detection circuit 48.

As illustrated in FIG. 9, the photodiode PD has a good efficiency in a wavelength range from approximately 300 nm to approximately 1000 nm. That is, the photodiode PD is sensitive to wavelengths of both the first light emitted from the first light source 61 and the second light emitted from the second light source 62. Therefore, each of the photodiodes PD can detect a plurality of beams of light having different wavelengths.

Figure 10:
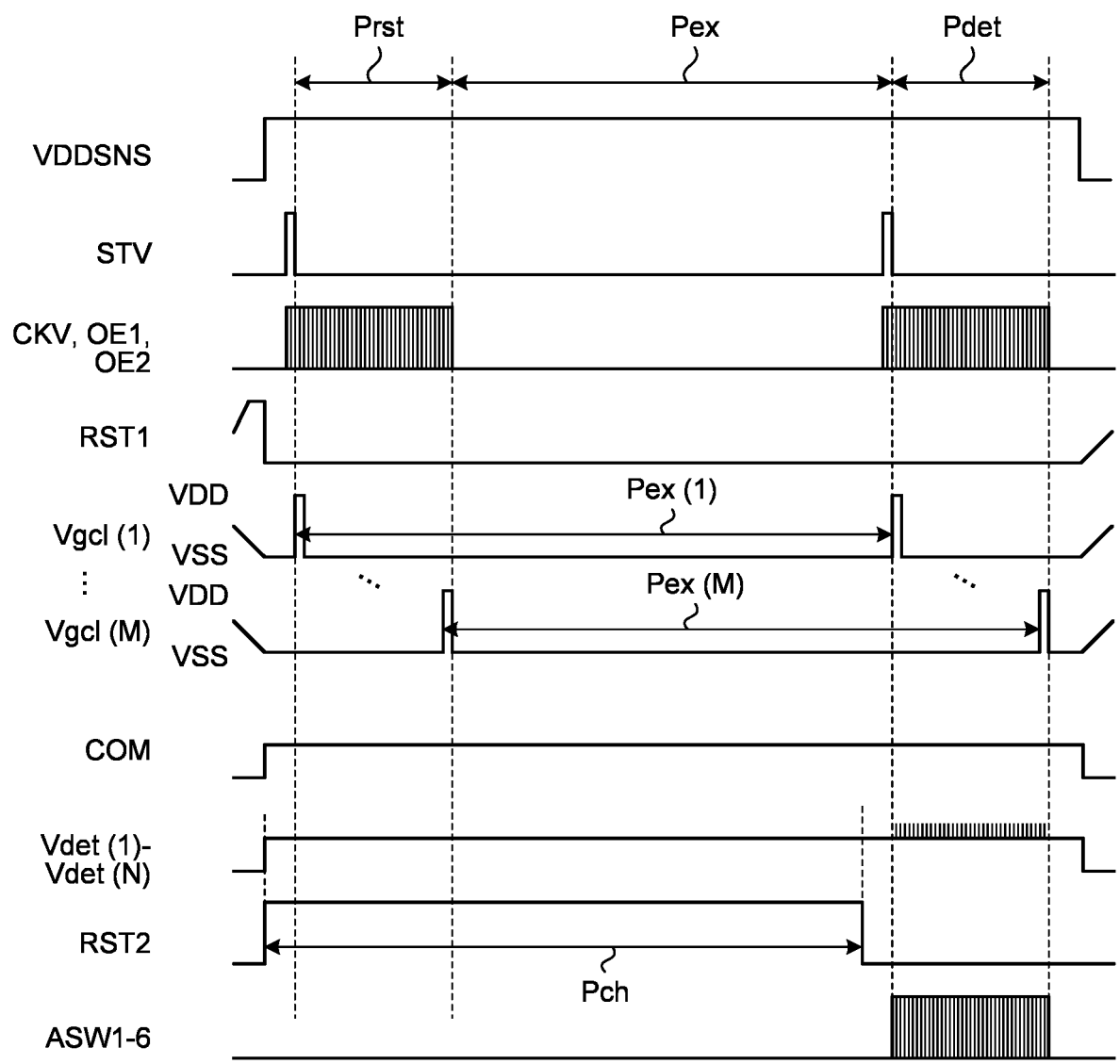
FIG. 10 is a timing waveform diagram illustrating an operation example of the detection device.
Figure 11:
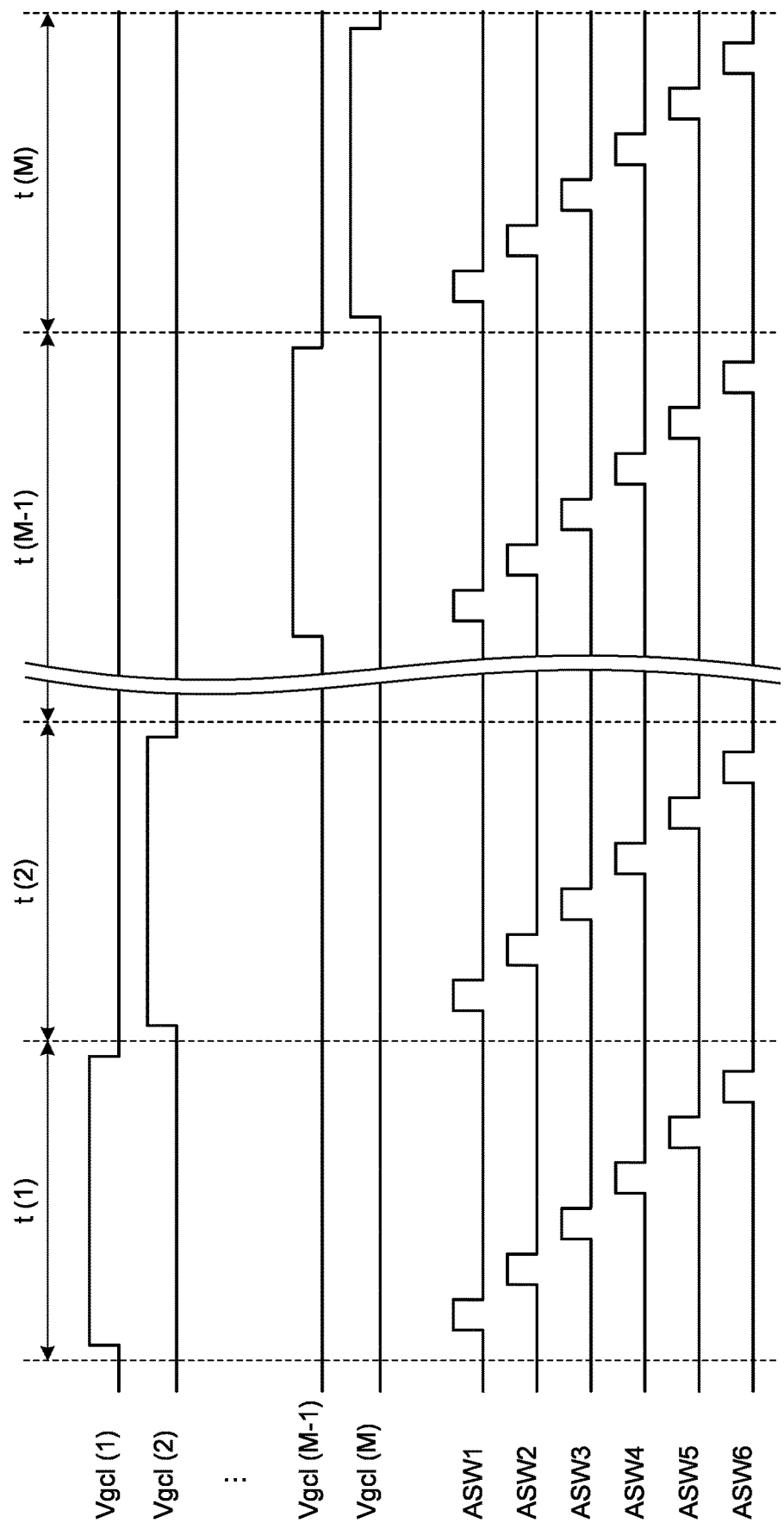
FIG. 11 is a timing waveform diagram illustrating an operation example during a reading period in FIG. 10.

The following describes an operation example of the detection unit 1. FIG. 10 is a timing waveform diagram illustrating an operation example of the detection unit 1. FIG. 11 is a timing waveform diagram illustrating an operation example during the reading period in FIG. 10.

As illustrated in FIG. 10, the detection unit 1 includes the reset period Prst, an exposure period Pex, and the reading period Pdet. The power supply circuit 123 supplies the sensor power supply signal VDDSNS to the anode of the photodiode PD over the reset period Prst, the exposure period Pex, and the reading period Pdet. At a time before the reset period Prst starts, the control circuit 122 supplies the reference signal COM and the reset signal RST2 serving as a high-level voltage signal to the reset circuit 17. In this case, the reference signal COM is at 0.75 V. The control circuit 122 supplies the start signal STV to the gate line drive circuit 15 to start the reset period Prst.

During the reset period Prst, the gate line drive circuit 15 sequentially selects the gate lines GCL based on the start signal STV, the clock signal CK, and the reset signal RST1. The gate line drive circuit 15 sequentially supplies the gate drive signals Vgcl to the gate lines GCL. The gate drive signal Vgcl has a pulsed waveform having a power supply voltage VDD serving as a high-level voltage and a power supply voltage VSS serving as a low-level voltage. In FIG. 10, M (where M is, for example, 256) of the gate lines GCL are provided, and the gate drive signals Vgcl(1), . . . , Vgcl(M) are sequentially supplied to the respective gate lines GCL.

Thus, during the reset period Prst, the capacitive elements Ca of all the partial detection areas PAA are sequentially electrically coupled to the signal lines SGL, and are supplied with the reference signal COM. As a result, the capacities of the capacitive elements Ca are reset.

After the gate drive signal Vgcl(M) is supplied to the gate line GCL, the exposure period Pex starts. The start timing and the end timing of the actual exposure periods Pex(1), . . . , Pex(M) are different among the partial detection areas PAA corresponding to the respective gate lines GCL. Each of the exposure periods Pex(1), . . . , Pex(M) starts when the gate drive signal Vgcl changes from the power supply voltage VDD serving as the high-level voltage to the power supply voltage VSS serving as the low-level voltage during the reset period Prst. Each of the exposure periods Pex(1), . . . , Pex(M) ends when the gate drive signal Vgcl changes from the power supply voltage VSS to the power supply voltage VDD during the reading period Pdet. The lengths of exposure time of the exposure periods Pex(1), . . . , Pex(M) are equal. Each of the exposure period Pex(1), . . . , Pex(M) represents a period in which an optical current may occur by the photodiode PD, but does not necessarily represents a lighting period of the light source provided outside.

During the exposure period Pex, the current corresponding to the light irradiating the photodiode PD flows in each of the partial detection areas PAA. As a result, an electrical charge is stored in each of the capacitive elements Ca.

At a time before the reading period Pdet starts, the control circuit 122 sets the reset signal RST2 to a low-level voltage. This operation stops operation of the reset circuit 17. During the reading period Pdet, the gate line drive circuit 15 sequentially supplies the gate drive signals Vgcl(1), . . . , Vgcl(M) to the gate lines GCL in the same manner as during the reset period Prst.

Specifically, as illustrated in FIG. 11, the gate line drive circuit 15 supplies the gate drive signal Vgcl(1) at the high-level voltage (power supply voltage VDD) to the gate line GCL(1) during a period t(1). The control circuit 122 sequentially supplies selection signals ASW1, . . . , ASW6 to the signal line selection circuit 16 during a period in which the gate drive signal Vgcl(1) is at the high-level voltage (power supply voltage VDD). This operation sequentially or simultaneously couples the signal lines SGL of the partial detection areas PAA selected by the gate drive signal Vgcl(1) to the detection circuit 48. As a result, the detection signal Vdet for each of the partial detection areas PAA is supplied to the detection circuit 48.

In the same manner, the gate line drive circuit 15 supplies the gate drive signals Vgcl(2), . . . , Vgcl(M−1), Vgcl(M) at the high-level voltage to gate lines GCL(2), . . . , GCL(M−1), GCL(M) during periods t(2), . . . , t(M−1), t(M), respectively. That is, the gate line drive circuit 15 supplies the gate drive signal Vgcl to the gate line GCL during each of the periods t(1), t(2), . . . , t(M−1), t(M). The signal line selection circuit 16 sequentially selects the signal line SGL based on the selection signal ASW during each period in which the gate drive signal Vgcl is set to the high-level voltage. The signal line selection circuit 16 sequentially couples each of the signal lines SGL to the one detection circuit 48. Thus, the detection unit 1 can output the detection signals Vdet of all the partial detection areas PAA to the detection circuit 48 during the reading period Pdet.

Although FIG. 11 illustrates the example in which the gate line drive circuit 15 selects one of the gate lines GCL in each of the periods t, the present disclosure is not limited to this example. The gate line drive circuit 15 may simultaneously select a predetermined number (two or more) of the gate lines GCL, and sequentially supply the gate drive signals Vgcl to each unit of the predetermined number of the gate lines GCL. The signal line selection circuit 16 may also simultaneously couple a predetermined number (two or more) of the signal lines SGL to the one detection circuit 48. Moreover, the gate line drive circuit 15 may thin out some of the gate lines GCL and scan the remaining ones.

The above description with reference to FIG. 10 has been made on the assumption that the gate drive signals Vgcl(1), Vgcl(2), . . . , Vgcl(M−1), Vgcl(M) are supplied to the gate lines GCL(1), GCL(2), . . . , GCL(M−1), GCL(M). However, the operation of the detection device 100 in the embodiment is not limited to this description. For example, an operation mode may be employed that includes a plurality of sequences of supplying the gate drive signals to some of these gate lines.

In the embodiment, the control circuit 122, the detection circuit 48, and the gate line drive circuit 15 determine in advance which of the gate lines (for example, the gate lines GCL(1), GCL(2), . . . , GCL(M−1), GCL(M)) provided over the entire detection area AA are included in partial areas (for example, the partial areas AA1, AA2, . . . , AA7, AA8) of the detection area AA. Therefore, the operation for each of the partial areas of the detection area AA can be achieved by controlling which of the gate lines is to be supplied with the gate drive signal under the control of the control circuit 122. The following describes examples of the operation modes employable in the embodiment, with reference to FIG. 12.

FIG. 12 is a chart illustrating the examples of the operation modes employable in the embodiment. In the embodiment, the light sources 60 are individually provided in the positions at 0°, 45°, 90°, 135°, 180°, 225°, 270°, and 315°, as described with reference to FIGS. 2 and 3. In the embodiment, the light sources 60 in these positions are controlled to be lit up at times different from one another.

In FIG. 12, an operation process of the detection device 100 in the embodiment includes Sequence 1, Sequence 2, Sequence 3, Sequence 4, Sequence 5, Sequence 6, Sequence 7, and Sequence 8. In Sequence 1, at least either of the first light sources 61 and the second light sources 62 included in the light sources 60 provided in the position at 0° illustrated in FIGS. 2 and 3 are lit up in the exposure period Pex. In Sequence 2, at least either of the first light sources 61 and the second light sources 62 included in the light sources 60 provided in the position at 45° illustrated in FIGS. 2 and 3 are lit up in the exposure period Pex. In Sequence 3, at least either of the first light sources 61 and the second light sources 62 included in the light sources 60 provided in the position at 90° illustrated in FIGS. 2 and 3 are lit up in the exposure period Pex. In Sequence 4, at least either of the first light sources 61 and the second light sources 62 included in the light sources 60 provided in the position at 135° illustrated in FIGS. 2 and 3 are lit up in the exposure period Pex. In Sequence 5, at least either of the first light sources 61 and the second light sources 62 included in the light sources 60 provided in the position at 180° illustrated in FIGS. 2 and 3 are lit up in the exposure period Pex. In Sequence 6, at least either of the first light sources 61 and the second light sources 62 included in the light sources 60 provided in the position at 225° illustrated in FIGS. 2 and 3 are lit up in the exposure period Pex. In Sequence 7, at least either of the first light sources 61 and the second light sources 62 included in the light sources 60 provided in the position at 270° illustrated in FIGS. 2 and 3 are lit up in the exposure period Pex. In Sequence 8, at least either of the first light sources 61 and the second light sources 62 included in the light sources 60 provided in the position at 315° illustrated in FIGS. 2 and 3 are lit up in the exposure period Pex.

In the following description, when the sequences from Sequence 1 to Sequence 8 are performed, the sequences are assumed to be performed in the order of Sequence 1, Sequence 2, Sequence 3, Sequence 4, Sequence 5, Sequence 6, Sequence 7, and Sequence 8. However, the order is not limited to this order. That is, the light sources 60 to be lit up need not be shifted by 45° each time. Each of the sequences performed in the operation process of the detection device 100 in the embodiment only needs to be performed once in each series of operations.

The range of the detection area AA in which the operation is executed when Sequence 1, Sequence 2, Sequence 3, Sequence 4, Sequence 5, Sequence 6, Sequence 7, and Sequence 8 are performed may be the entire detection area AA or a portion of the detection area AA. Hereafter, the range of the detection area AA in which the operation is executed may be referred to as "active area".

In Example 1 illustrated in FIG. 12, the entire detection area AA serves as the active area when each of Sequence 1, Sequence 2, Sequence 3, Sequence 4, Sequence 5, Sequence 6, Sequence 7, and Sequence 8 is performed. That is, in each of Sequence 1, Sequence 2, Sequence 3, Sequence 4, Sequence 5, Sequence 6, Sequence 7, and Sequence 8, the respective photodiodes PD included in the detection area AA are supplied with the gate drive signals Vgcl(1), Vgcl(2), . . . , Vgcl(M−1), Vgcl(M), and output the detection signals Vdet, as described with reference to FIGS. 10 and 11.

In Example 2 illustrated in FIG. 12, the partial area AA1 serves as the active area when Sequence 1 is performed. In Example 2, the partial area AA2 serves as the active area when Sequence 2 is performed. In Example 2, the partial area AA3 serves as the active area when Sequence 3 is performed. In Example 2, the partial area AA4 serves as the active area when Sequence 4 is performed. In Example 2, the partial area AA5 serves as the active area when Sequence 5 is performed. In Example 2, the partial area AA6 serves as the active area when Sequence 6 is performed. In Example 2, the partial area AA7 serves as the active area when Sequence 7 is performed. In Example 2, the partial area AA8 serves as the active area when Sequence 8 is performed.

Thus, in Example 2, the angle of the light sources 60 lit up in each of the sequences is the same as the angle at which the partial area of the detection area AA serving as the active area is located. In other words, in Example 2, each of the sequences lights up the light sources 60 that are disposed at both ends of the tube of the housing 201 so as to face each other with the partial area of the detection area AA serving as the active area interposed therebetween.

Example 2 as described above is employed when the photodiodes PD included in the active area detect reflected light of light from the light sources 60 lit up in each of the sequences. Specifically, Example 2 is employed in reflective photoplethysmography.

The reflective photoplethysmography is a method to obtain information indicating the pulse rate of a living organism by irradiating a skin surface of the living organism, such as a human, with light such as red or green light, and detecting the reflected light of the light using the photodiodes PD. FIG. 2 schematically illustrates the reflected light as reflected light RL1 and RL2. The reflected light RL1 is actually light that is emitted from the first light sources 61 to the finger Fg illustrated in FIG. 3, and is reflected by the finger Fg to enter the detection area AA. The reflected light RL2 is actually light that is emitted from the second light sources 62 to the finger Fg illustrated in FIG. 3, and is reflected by the finger Fg to enter the detection area AA.

The photoplethysmography uses a property that a protein such as hemoglobin that exhibits a characteristic of being combined with oxygen in blood vessels absorbs a portion of the light, and thus can measure the pulse rate of the living organism based on a light-dark pattern generated in the light detected by the photodiodes PD according to the property. In the embodiment, the frequency at which the processing in the reset period Prst, the exposure period Pex, and the reading period Pdet described with reference to FIG. 10 is performed (for example, 60 times/second, that is, 3600 times/minute) is sufficiently higher than that of a general human pulses per minute (for example, 100 pulses per minute or lower). Therefore, the pulse rate can be measured based on light-dark matrix data in an image form that represents the brightness and darkness of the blood vessels in a portion or all of the detection area AA.

In Example 2, at least either of the first light sources 61 and the second light sources 62 included in the light sources 60 disposed at an angle where the light sources 60 are to be lit up only need to be lit up in each of the sequences. Naturally, both the first light sources 61 and the second light sources 62 included in the light sources 60 may be lit up.

In Example 3 illustrated in FIG. 12, the partial area AA5 serves as the active area when Sequence 1 is performed. In Example 3, the partial area AA6 serves as the active area when Sequence 2 is performed. In Example 3, the partial area AA7 serves as the active area when Sequence 3 is performed. In Example 3, the partial area AA8 serves as the active area when Sequence 4 is performed. In Example 3, the partial area AA1 serves as the active area when Sequence 5 is performed. In Example 3, the partial area AA2 serves as the active area when Sequence 6 is performed. In Example 3, the partial area AA3 serves as the active area when Sequence 7 is performed. In Example 3, the partial area AA4 serves as the active area when Sequence 8 is performed.

Example 3 as described above is employed when the photodiodes PD included in the active area detect transmitted light of the light from the light sources 60 lit up in each of the sequences. Specifically, Example 3 is employed in transmissive photoplethysmography.

The transmissive photoplethysmography is a method to obtain the information indicating the pulse rate of the living organism by irradiating a tissue of the living organism, such as a human, with red light including infrared light, and detecting light of the red light including the infrared light transmitted through the tissue using the photodiodes PD. In Example 3, the first light sources 61 are lit up among the first light sources 61 and the second light sources 62 included in the light sources 60 disposed at an angle where the light sources 60 are to be lit up in each of the sequences. This is because the transmissibility of infrared light is higher than that of visible light. FIG. 3 schematically illustrates the light XL emitted from the first light sources 61 and transmitted through the finger Fg.

In Example 1, either of the reflective photoplethysmography and the transmissive photoplethysmography described above may be employed, or processes of individually measuring the pulse rate may be performed using both the reflective photoplethysmography and the transmissive photoplethysmography. In Example 1, at least the first light sources 61 are lit up among the first light sources 61 and the second light sources 62 included in the light sources 60 disposed at an angle where the light sources 60 are to be lit up in each of the sequences.

The above description assumes that the partial areas AA1, AA2, . . . , AA7, AA8 are portions of the detection area AA in Example 2 and Example 3. However, each of the partial areas AA1, AA2, . . . , AA7, AA8 may be the detection area AA illustrated in FIG. 4. In that case, the detection area AA of the detection unit 1 illustrated in FIG. 4 is provided at intervals of 45° in the housing 201. The detection areas AA of the detection units 1 are arranged such that the connecting portion CP1 of one of two of the detection areas AA adjacent along a ring formed by the inner peripheral surface of the housing 201 overlaps the connecting portion CP2 of the other of the two detection areas AA.

In each of the examples of the embodiment, a process of measuring the pulse rate by operation of the detection device 100 includes a positioning process and a pulse rate measurement process. The positioning process is a process of performing processing to determine which of the partial areas (for example, the partial areas AA1, AA2, AA3, AA4, AA5, AA6, AA7, and AA8) included in the detection area AA is to be used to measure the pulse rate. The pulse rate measurement process is a process of performing processing to measure the pulse rate in the partial area determined by the positioning process, that is, in the partial area of the detection area AA used for measuring the pulse rate.

Figure 13:
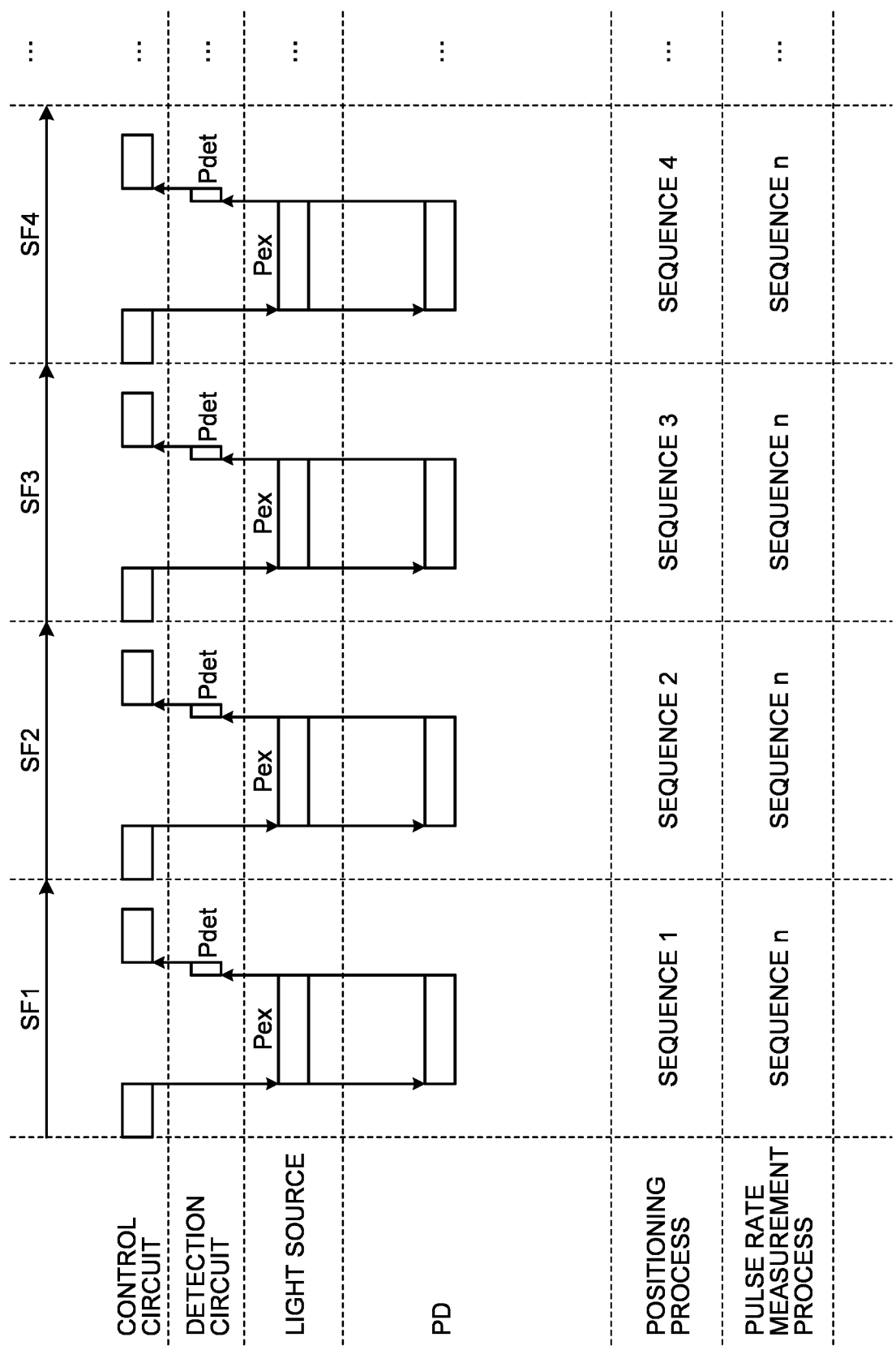
FIG. 13 is a timing diagram illustrating contrast between a positioning process and a pulse rate measurement process.

FIG. 13 is a timing diagram illustrating contrast between the positioning process and the pulse rate measurement process. In the positioning process and the pulse rate measurement process, the exposure period Pex and the reading period Pdet after the exposure period Pex are commonly repeated under the control of the control circuit 122. That is, in the exposure period Pex, the light sources 60 are lit up, and the capacitive element Ca stores an electrical charge in response to the light detected by the photodiode PD. In the reading period Pdet, the detection circuit 48 acquires the output of the detection signal Vdet. In FIG. 13, the repetition of the exposure period Pex and the reading period Pdet described above is illustrated by temporally consecutive notations. The temporally consecutive notations are illustrated by sequentially increasing numbers of sequence periods SF. The sequence periods SF include any one or more of sequence periods SF1, SF2, SF3, SF4, . . . . Although not illustrated in FIG. 13, the processing in the reset period Prst is naturally performed after the reading period Pdet before the exposure period Pex. The term "sequence period SF" includes the sequence periods SF1, SF2, SF3, SF4, . . . .

In the positioning process, a different sequence is performed in each of sequence periods SF. In FIG. 13, Sequence 1 described with reference to FIG. 12 is performed in the sequence period SF1. Sequence 2 described with reference to FIG. 12 is performed in the sequence period SF2. Sequence 3 described with reference to FIG. 12 is performed in the sequence period SF3. Sequence 4 described with reference to FIG. 12 is performed in the sequence period SF4. Although FIG. 13 does not illustrate Sequence 5 and the later sequences, Sequence 5 described with reference to FIG. 12 is performed in the sequence period SF5. Sequence 6 described with reference to FIG. 12 is performed in the sequence period SF6. Sequence 7 described with reference to FIG. 12 is performed in the sequence period SF7. Sequence 8 described with reference to FIG. 12 is performed in the sequence period SF8. The processing represented by a first rectangle corresponds to, for example, the processing from Step S1 to Step S4 in FIG. 14 described later. The first rectangle is a rectangle located temporally before the exposure period Pex of the "light source" column among the rectangles illustrated on the "control circuit" column in FIG. 13. A second rectangle corresponds to, for example, the processing from Step S5 to Step S7, or the processing from Step S5 to Step S11 in FIG. 14 described later. The second rectangle is a rectangle located temporally after the reading period Pdet of the "detection circuit" column among the rectangles illustrated on the "control circuit" column in FIG. 13. For example, processing at Step S13 is performed at each border between the sequence periods SF illustrated in FIG. 13.

In the positioning process, all the sequences described with reference to FIG. 12 are sequentially performed. In the positioning process, a determination is made as to which of all the sequences performed is considered to be capable of best measuring the pulse rate. Details of the positioning process will be described with reference to FIGS. 14, 15, and 16 explained later. The positioning process selects a sequence that is considered to be capable of best measuring the pulse rate. That is, in the positioning process, the selection of the sequence determines which angle is to be selected as an angle at which the light sources 60 to be lit up among the light sources 60 are provided, and which of the partial areas included in the detection area AA is to be selected as an area in which the reflected light or the transmitted light of the light from the light sources 60 being lit up is detected.

In the pulse rate measurement process, processing is performed to measure the pulse rate in the partial area determined in the positioning process, that is, in the partial area of the detection area AA used for measuring the pulse rate. FIG. 13 illustrates Sequence n as being commonly performed in the sequence periods SF1, SF2, SF3, SF4, . . . . In the case of the embodiment, n is any one of natural numbers from one to eight. That is, in the pulse rate measurement process, one of Sequence 1, Sequence 2, Sequence 3, Sequence 4, Sequence 5, Sequence 6, Sequence 7, and Sequence 8 described with reference to FIG. 12 is successively performed.

Figure 14:
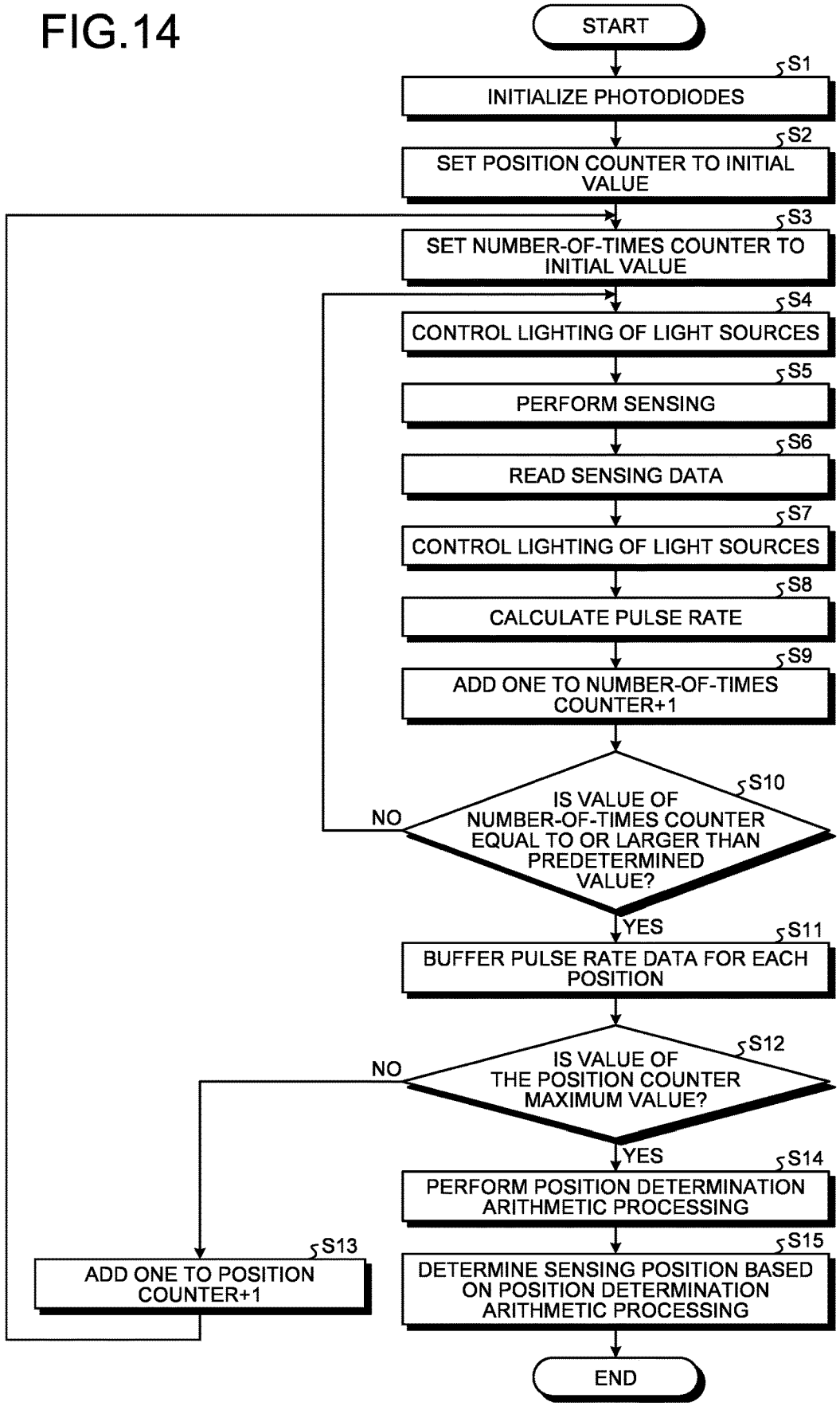
FIG. 14 is a flowchart illustrating a flow of positioning processing in the detection device.

FIG. 14 is a flowchart illustrating a flow of the positioning processing in the detection device 100. First, the photodiodes PD are initialized by implementing the reset period Prst (Step S1). Then, the control circuit 122 sets a position counter to an initial value (Step S2). The position counter is a counter for determining the succession of the sequences, that is, the angle of the light sources 60 to be lit up and the angle of the active area. In the embodiment, the initial value of the position counter is zero. In the embodiment, since the number of the sequences is eight, the maximum value of the position counter is seven.

The control circuit 122 sets a number counter to an initial value (Step S3). The number counter is a counter for managing the number of times of repetition of the lighting control of the light source and the acquisition of the output of the detection signal Vdet from the photodiode PD included in the active area in each of the sequences. In the embodiment, the initial value of the number counter is zero. In the embodiment, as an example, a predetermined value of the number counter is 10.

The control circuit 122 performs the lighting control of the light sources 60 at an angle corresponding to the value of the position counter (Step S4). Specifically, the control circuit 122 lights up the light sources 60 that are to be lit up in a sequence indicated by "position counter value+1". For example, if the value of the position counter is zero, the control circuit 122 lights up the light sources 60 at 0° that are to be lit up in Sequence 1 illustrated in FIG. 12. Even if the value of the position counter is another value, the control circuit 122 uses the same concept to light up the light sources 60 at an angle at which the light sources 60 are to be lit up in a corresponding sequence. The period in which Step S4 is performed is the exposure period Pex described with reference to FIG. 10. The photodiode PD performs sensing (Step S5). Specifically, the period of Step S5 is the same as the exposure period Pex during which the light sources 60 are lit up by the processing at Step S4. The processing at Step S5 causes a current to flow correspondingly to the light irradiating the photodiode PD. As a result, an electrical charge is stored in each of the capacitive elements Ca.

The control circuit 122 performs the lighting control of the light sources 60 at the angle corresponding to the value of the position counter (Step S6). Specifically, the control circuit 122 turns off the light sources 60 that have been lit up by the processing at Step S4 performed immediately before this step.

The detection circuit 48 reads sensing data (Step S7). Specifically, the detection circuit 48 causes the photodiodes PD to be processed, to each output the detection signal Vdet in the reading period Pdet. The photodiodes PD to be processed are photodiodes included in a portion or all of the detection area AA that serves as the active area in the sequence indicated by "position counter value+1". Thus, the photoplethysmography is performed to obtain the light-dark matrix data in an image form representing the brightness and darkness detected in a portion or all of the detection area AA.

The control circuit 122 calculates the pulse rate based on the sensing data obtained by the processing at Step S7 (Step S8). Specifically, the control circuit 122 calculates the pulse rate based on the frequency of acquisition of the light-dark matrix data obtained by the processing at Step S7 and the degree of change in a plurality of pieces of the light-dark matrix data that have been successively obtained. Since the algorithm of calculation of the pulse rate is based on the known photoplethysmography, detailed explanation is not made.

The number of the exposure periods Pex and the number of the reading periods Pdet included in the processing from Step S4 to Step S7 performed before the processing at Step S8 are each not limited to one. In reality, the light-dark matrix data is acquired a plurality of times during a predetermined time for allowing the pulse rate to be calculated by the processing at Step S8. Although not illustrated in the flowchart given in FIG. 14, the reset period Prst is naturally implemented before the exposure period Pex implemented after the reading period Pdet.

The control circuit 122 adds one to the value of the number counter at which the initial value was set by the processing at Step S3 (Step S9). Then, the control circuit 122 determines whether the value of the number counter is equal to or larger than the predetermined value (Step S10). If the value of the number counter is smaller than the predetermined value (No at Step S10), the processing at Step S4 is performed. That is, the processing from Step S4 to Step S9 is repeated until the value of the number counter reaches the predetermined value or larger.

If the value of the number counter is equal to or larger than the predetermined value in the processing at Step S10 (Yes at Step S10), the control circuit 122 temporary stores the pulse rate data for each position (Step S11). Specifically, the control circuit 122 temporary stores and holds data representing the calculation results of the pulse rate obtained by the processing at Step S8 repeated the predetermined value of times (10 times, for example) immediately before this step, as the pulse rate data at the location (angle) at which the light sources 60 are lit up in the sequence indicated by the position counter value+1 and that serves as the active area.

The control circuit 122 determines whether the value of the position counter is the maximum value (Step S12). If not (No at Step S12), the control circuit 122 adds one to the position counter (Step S13), and performs the processing at Step S3. That is, the processing at Step S3 and the repetition of the processing from Step S4 to Step S9 by the predetermined value of times (10 times, for example) are performed for each value of the position counter until the processing at Step S3 and the repetition of the processing from Step S4 to Step S9 by the predetermined value of times (10 times, for example) are completed when the value of the position counter reaches the maximum value.

If the value of the position counter is the maximum value in the processing at Step S12 (Yes at Step S12), the control circuit 122 performs position determination arithmetic processing (Step S14), and determines the sensing position based on the position determination arithmetic processing (Step S15). The following describes the position determination arithmetic processing and a specific mechanism for the determination of the sensing position based on the position determination arithmetic processing, with reference to FIGS. 15 and 16.

FIG. 15 is a chart illustrating types of the position determination arithmetic processing and details of each of the types of the processing. FIG. 16 is a chart illustrating, as a table, an exemplary relation among measurement results of the pulse rates (for 10 times) at each of the angles of 0°, 45°, 90°, 135°, 180°, 225°, 270°, and 315°, the actual pulse rate at each of the angles, the mean result of the measurement results (for 10 times) of the pulse rates, and the standard deviation of the measurement results (for 10 times) of the pulse rates.

As illustrated in FIG. 15, the types of the position determination arithmetic processing include "standard deviation", "mean value", and "difference between minimum and maximum values". The control circuit 122 performs the position determination arithmetic processing for any one of the "standard deviation", "mean value", and "difference between minimum and maximum values" as the processing at Step S14 mentioned above.

In the position determination arithmetic processing for calculating the "standard deviation", the control circuit 122 calculates the standard deviation of the pulse rates measured a plurality of times in each of the sequences, for each of the sequences. Thus, the control circuit 122 individually calculates the standard deviation of the pulse rates that have been measured a number of times (10 times, for example) counted by the number counter described above, as the standard deviation in each of Sequence 1 to Sequence 8 described with reference to FIG. 12. The standard deviation of Sequence 1 is the standard deviation of the pulse rates that have been measured while the position counter was zero. According to the same concept, the standard deviation of Sequence q+1 is the standard deviation of the pulse rates that have been measured while the position counter was q. q is any one of natural numbers 1 to 7.

If the processing at Step S14 has employed the position determination arithmetic processing for calculating the "standard deviation", the control circuit 122 determines, in the processing at Step S15, a location (angle) in a sequence with the smallest standard deviation at which the partial area of the detection area AA in which the reading period Pdet is implemented is located, as a location at which the pulse rate is to be sensed later. The control circuit 122 also determines a location (angle) at which the light sources 60 that were lit up in the sequence with the smallest standard deviation were provided, as the light sources 60 to be lit up when the pulse rate is sensed later.

In FIG. 16, the angle with the smallest standard deviation is 0°. Therefore, in the processing at Step S15, if the processing at Step S14 has employed the position determination arithmetic processing for calculating the "standard deviation", the partial area AA1 at the angle of 0° is treated, as the location at which the pulse rate is to be sensed later. In the case of Example 2, the light sources 60 at the angle of 0° are treated as the light sources 60 to be lit up when the pulse rate is sensed later. In the case of Example 3, the light sources 60 at an angle of 180° are treated as the light sources 60 to be lit up when the pulse rate is sensed later.

In the position determination arithmetic processing for calculating the "mean value", the control circuit 122 calculates the mean value of the pulse rates measured a plurality of times in each of the sequences, for each of the sequences. Thus, the control circuit 122 individually calculates the mean value of the pulse rates that have been measured a number of times (10 times, for example) counted by the number counter described above, as the mean value in each of Sequence 1 to Sequence 8 described with reference to FIG. 12. The mean value of Sequence 1 is the mean value of the pulse rates that have been measured while the position counter was zero. According to the same concept, the mean value of Sequence q+1 is the mean value of the pulse rates that have been measured while the position counter was q. The control circuit 122 further calculates the "mean value of pulse rates at all locations". Specifically, the control circuit 122 calculates the mean value of the respective mean values of Sequence 1 to Sequence 8 as the "mean value of pulse rates at all locations".

If the processing at Step S14 has employed the position determination arithmetic processing for calculating the "mean value", the processing proceeds to Step S15. At Step S15, the control circuit 122 determines a first location (or, a first angle) as the location at which the pulse rate is to be sensed later. The first location (or, the first angle) is a location (or, an angle) having the partial area of the detection area AA in which the reading period Pdet is implemented in a sequence in which a certain mean value was calculated. The certain mean value represents the mean value closest to the "mean value of pulse rates at all locations" was calculated among the respective mean values of Sequence 1 to Sequence 8. The control circuit 122 also determines a second location (or, a second angle) as the light sources 60 to be lit up when the pulse rate is sensed later. The second location (or, the second angle) is a location (or, an angle) at which the light sources 60 that were lit up were provided in the sequence in which the certain mean value was calculated.

In FIG. 16, the "mean value of pulse rates at all locations" is (88.8+87.8+66+78.3+78.3+70.9+84.5+82.4)/8=79.625. Thus, in FIG. 16, the angles at which the mean value is closest to the "mean value of pulse rates at all locations" are 135° and 180° at which the mean value is 78.3. Therefore, in the processing at Step S15, if the processing at Step S14 has employed the position determination arithmetic processing for calculating the "mean value", the partial area of the detection area AA at at least one of the angles of 135° and 180° (at least one of the partial areas AA4 and AA5) is treated, as the location at which the pulse rate is to be sensed later. When partial areas of the detection area AA at two or more angles are employed in this manner, a predetermined rule may be set so as to activate either one of the partial areas (for example, one at a smaller angle), or so as to activate both of the partial areas in the pulse rate measurement process. In the case of Example 2, the light sources 60 at the same angle as that of the detection area AA4 are treated as the light sources 60 to be lit up when the pulse rate is sensed later. In the case of Example 3, the light sources 60 at an angle shifted by 180° from that of the detection area AA4 are treated as the light sources 60 to be lit up when the pulse rate is sensed later.

In the position determination arithmetic processing for calculating the "difference between minimum and maximum values", the control circuit 122 identifies the maximum and minimum values of the pulse rates measured a plurality of times in each of the sequences, for each of the sequences. Thus, the control circuit 122 individually identifies the maximum and minimum values of the pulse rates measured a number of times (10 times, for example) counted by the number counter described above, as the maximum and minimum values in each of Sequence 1 to Sequence 8 described with reference to FIG. 12.

The processing will be described regarding the case where the processing at Step S14 has employed the position determination arithmetic processing for calculating the "difference between minimum and maximum values". In this case, the control circuit 122 determines, in the processing at Step S15, a third location (or, a third angle) as the location at which the pulse rate is to be sensed later. The third location (or, the third angle) represents a location (or, an angle) having the partial area of the detection area AA in which the reading period Pdet is implemented in a sequence with the smallest difference between the maximum and minimum values. The control circuit 122 also determines a location (angle) at which the light sources 60 that were lit up in the sequence with the smallest difference between the maximum and minimum values were provided, as the light sources 60 to be lit up when the pulse rate is sensed later.

In FIG. 16, the angle with the smallest difference between the maximum and minimum values is 0°. Therefore, in the processing at Step S15, if the processing at Step S14 has employed the position determination arithmetic processing for calculating the "difference between minimum and maximum values", the partial area AA1 at the angle of 0° is treated, as the location at which the pulse rate is to be sensed later. In the case of Example 2, the light sources 60 at the angle of 0° are treated as the light sources 60 to be lit up when the pulse rate is sensed later. In the case of Example 3, the light sources 60 at the angle of 180° are treated as the light sources 60 to be lit up when the pulse rate is sensed later.

In the pulse rate measurement process described with reference to FIG. 13, the sequence corresponding to the sensing position determined by the processing at Step S15 (any one of Sequence 1 to Sequence 8) is treated as Sequence n.

In Example 1 described with reference to FIG. 12, the entire detection area AA is active in any of the sequences from Sequence 1 to Sequence 8. However, in reality, in the same manner as in Example 2 or 3, the light-dark matrix data is more clearly obtained at the same angle as that of the light sources 60 operating in each of the sequences or at an angle shifted by 180° from the light sources 60 operating in each of the sequences. Therefore, the operation of Example 1 substantially serves also as that of Example 2 and Example 3. In Example 1, the positioning processing described above is also effective in terms of determining which location (angle) is to be selected as a location (angle) at which the light sources 60 are to be lit up.

As described above, the detection device 100 includes an annular substrate (sensor substrate 21), optical sensors (photodiodes PD provided in the detection area AA) annularly arranged along the substrate, and a plurality of light sources (light sources 60) annularly arranged correspondingly to the arrangement of the optical sensors.

This configuration allows the optical sensors arranged so as to surround a subject of detection to perform sensing by accommodating the subject of detection in the ring formed by the optical sensors. That is, the sensing can be performed from the entire circumference of the ring. Accordingly, since the positional relation between the optical sensors and the subject of detection is more stable in the circumferential direction of the ring, better sensing can be performed.

A light source (light source 60) includes a first light source (first light source 61) that emits red light and a second light source (second light source 62) that emits green light, and a plurality of the first light sources and a plurality of the second light sources are alternately arranged in a ring shape. This configuration allows both the sensing using the red light emitted by the first light source and the sensing using the green light emitted by the second light source.

The detection device 100 performs the detection using at least one of a transmissive detection method and a reflective detection method. In the transmissive detection method, light from any one of the light sources (light sources 60) is transmitted through the subject of detection (finger Fg, for example) located inside the annularly arranged optical sensors (photodiodes PD provided in the detection area AA), and one of the optical sensors in a position facing the light source emitting the light with the subject of detection interposed therebetween performs the detection. In the reflective detection method, light from any one of the light sources is reflected by the subject of detection and is detected by the optical sensor in a position corresponding to the location of the light source that emits light. Thus, the detection can be performed using at least one of the transmissive detection method and the reflective detection method.

In the transmissive detection method described above, the first light source (first light source 61) is lit up. As a result, the sensing by the transmissive detection method described above can be performed using the red light that includes or is close to infrared light that can be more easily transmitted.

In the reflective detection method described above, at least one of the first light source (first light source 61) and the second light source (second light source 62) is lit up. As a result, the sensing by the reflective detection method can be performed.

A detection area (detection area AA) in which the optical sensors (photodiodes PD provided in the detection area AA) are arranged forms a circular ring. The optical sensors are provided so as to be capable of individually performing detection operation for each of a plurality of partial areas (such as the partial areas AA1, AA2, . . . , AA7, AA8) obtained by dividing a circumference formed by the circular ring into circular arcs each in a predetermined angular range (such as 45°). Each of the light sources (light sources 60) is provided on a lateral side of a corresponding one of the partial areas. The light source at a location corresponding to the partial area where the detection operation is performed is lit up. This configuration allows individual sensing in a predetermined angular range. Accordingly, sensing by the reflective detection method can be performed better using the optical sensor disposed in an angular range where the sensing can be performed better.

The detection area (detection area AA) in which the optical sensors (photodiodes PD provided in the detection area AA) are arranged forms a circular ring. The optical sensors are provided so as to be capable of individually performing the detection operation for each of a plurality of partial areas (such as the partial areas AA1, AA2, . . . , AA7, AA8) obtained by dividing a circumference formed by the circular ring into circular arcs each in a predetermined angular range (such as 45°). Each of the light sources (light sources 60) is provided on a lateral side of a corresponding one of the partial areas. The light source provided in a partial area facing the partial area where the detection operation is performed with the subject of detection (such as the finger Fg) interposed therebetween is lit up. This configuration allows individual sensing in a predetermined angular range. Accordingly, sensing by the transmissive detection method can be performed better using the optical sensor disposed in an angular range where the sensing can be performed better.

The predetermined angular range mentioned above is 45°. The optical sensors (photodiodes PD provided in the detection area AA) in the partial areas (such as the partial areas AA1, AA2, . . . , AA7, AA8) sequentially operate such that the partial area where the detection operation is performed is shifted in steps of 45°. This configuration can equally divide 360°, and the positional relation between one predetermined angular range and the subject of detection can be maintained sufficiently well in terms of accuracy of sensing, even if considering any misalignment in positional relation between the optical sensor and the subject of detection in the circumferential direction of the circular ring.

The subject of detection (such as the finger Fg) is a finger or a wrist of a human. The pulse rate is measured a plurality of times for each of the partial areas (such as the partial areas AA1, AA2, . . . , AA7, AA8) based on the light-dark pattern of the blood vessels included in the subject of detection, and a measurement result of the pulse rate in the partial area is employed that meets a predetermined condition about variation in the results of measurement of the pulse rate performed a plurality of times. This method allows the measurement of the pulse rate using the optical sensors (photodiode PD in the detection area AA) each in the predetermined angular range that can better measure the pulse rate.

The predetermined condition described above is that the standard deviation of the results of measurement of the pulse rate performed a plurality of times is the smallest. As a result, the predetermined angular range allowing better measurement of the pulse rate can be identified by simple calculation.

Alternatively, the predetermined condition described above is that the mean value is calculated that is closest to the mean value of the results of measurement of the pulse rate in all the partial regions. As a result, the predetermined angular range allowing better measurement of the pulse rate can be identified by simple calculation.

Still alternatively, the predetermined condition described above is that the difference between the maximum and minimum values of the results of measurement of the pulse rate performed a plurality of times is the smallest. The predetermined angular range allowing better measurement of the pulse rate can be identified by simple calculation.

The annular substrate (sensor substrate 21) is provided along the inner peripheral surface of a finger ring or a wristband (housing 201). With this configuration, when the housing 201 is a finger ring, sensing such as the measurement of the pulse rate can be easily performed by wearing the finger ring on a human finger. When the housing 201 is a wristband, sensing such as the measurement of the pulse rate can be easily performed by wearing the wristband on a human wrist.

Although not illustrated, the flexible printed circuit board 71, the control substrate 121, and components mounted on the flexible printed circuit board 71 or the control substrate 121 that are illustrated in FIG. 4 are located, for example, between the sensor substrate 21 and the housing 201 on the inner peripheral side of the housing 201. A space such as a recess may be provided on the inner peripheral side of the housing 201 to accommodate the flexible printed circuit board 71, the control substrate 121, and the components mounted on the flexible printed circuit board 71 or the control substrate 121. To ensure the space, a dome-shaped hollow portion or the like may be provided from the inner peripheral surface toward the outer peripheral surface of the housing 201. In addition, although not illustrated, a battery serving as a power supply for operating the detection unit 1 is mounted on the device 200, and is coupled to the power supply circuit 123 of the detection unit 1. The battery may be provided in the space, or may be provided along the outer peripheral surface of the housing 201. An interface (not illustrated) for charging the battery is further provided. The interface may be a connector intended for wired charging, or, for example, a coil intended for wireless charging.

The housing 201 may be a flexible resin or a cloth. The housing 201 may be provided so as to be switchable between a tubular shape and a flat cloth shape.

Specifically, the housing 201 may be a cloth that is formed into a tubular shape by being fastened by a fastener such as a hook-and-loop fastener or a button, and is formed into a flat cloth shape by being unfastened. The cloth may be a woven cloth or a non-woven cloth.

The light source 60 illustrated in FIG. 2 may be provided by being fixed in advance to the sensor substrate 21 on which the detection area AA is provided, or may be arranged independently of the detection area AA.

The photoplethysmography technique may be provided so as to be switchable in setting between the reflective photoplethysmography and the transmissive photoplethysmography. In that case, an interface such as an externally operable switch is further provided, and the control circuit 122 determines which of the reflective photoplethysmography and the transmissive photoplethysmography is to be used to operate the detection device 100 according to an operation through the interface.

In the embodiment described above, the partial areas (partial areas AA1, AA2, . . . , AA7, AA8) of the detection area AA and the light sources 60 are provided at intervals of 45°, but the predetermined angular range that divides the detection area AA into the partial areas is not limited to 45°. The predetermined angular range that divides the detection area AA into the partial areas is any angular range, but is preferably an angular range that can divide 360° into equal parts. When r° denotes an angle corresponding to the predetermined angular range, the number of the partial areas is 360/r. The light sources 60 are provided at intervals of the predetermined angular range regardless of the size of the predetermined angular range.

Other operational advantages accruing from the aspects described in the embodiment that are obvious from the description herein or that are appropriately conceivable by those skilled in the art will naturally be understood as accruing from the present disclosure.

What is claimed is:

1. A detection device comprising:
   an annular substrate;
   optical sensors annularly arranged at an inner circumferential side of a ring formed by an inner peripheral surface of the detection device, along a circumferential direction along the substrate; and
   a plurality of light sources annularly arranged correspondingly to the arrangement of the optical sensors, wherein
   the light sources are disposed at both sides of a detection area provided with the optical sensors, at the inner circumferential side of the ring, along the circumferential direction.

2. The detection device according to claim 1, wherein each of the light sources comprises:
   a first light source configured to emit red light; and
   a second light source configured to emit green light, and
   a plurality of the first light sources and a plurality of the second light sources are alternately arranged in a ring shape.

3. The detection device according to claim 2, wherein detection is configured to be performed using at least one of:
   a transmissive detection method in which light of any one of the light sources is transmitted through a subject of detection located inside the annularly arranged optical sensors, and one of the optical sensors in a position facing the light source emitting the light with the subject of detection interposed therebetween performs the detection, and
   a reflective detection method in which light from any one of the light sources is reflected by the subject of detection and is detected by one of the optical sensors in a position corresponding to a location of the light source that emits light.

4. The detection device according to claim 3, wherein the first light sources are configured to be lit up in the transmissive detection method.

5. The detection device according to claim 3, wherein at least either of the first light sources or the second light sources are configured to be lit up in the reflective detection method.

6. The detection device according to claim 1, wherein the annular substrate is provided along an inner peripheral surface of a finger ring.

7. The detection device according to claim 1, wherein the annular substrate is provided along an inner peripheral surface of a wristband.

8. A detection device comprising:
   an annular substrate;
   optical sensors annularly arranged along the substrate; and a plurality of light sources annularly arranged correspondingly to the arrangement of the optical sensors, wherein each of the light sources comprises:
   a first light source configured to emit red light; and
   a second light source configured to emit green light,
a plurality of the first light sources and a plurality of the second light sources are alternately arranged in a ring shape,
detection is configured to be performed using at least one of:
   a transmissive detection method in which light of any one of the light sources is transmitted through a subject of detection located inside the annularly arranged optical sensors, and one of the optical sensors in a position facing the light source emitting the light with the subject of detection interposed therebetween performs the detection, and
   a reflective detection method in which light from any one of the light sources is reflected by the subject of detection and is detected by one of the optical sensors in a position corresponding to a location of the light source that emits light,
at least either of the first light sources or the second light sources are configured to be lit up in the reflective detection method,
a detection area in which the optical sensors are arranged forms a circular ring,
the optical sensors are provided so as to be capable of individually performing a detection operation for each of a plurality of partial areas obtained by dividing a circumference formed by the circular ring into circular arcs each in a predetermined angular range,
each of the light sources is provided on a lateral side of a corresponding partial area of the partial areas, and
the light source, at a location corresponding to the partial area where the detection operation is performed, is configured to be lit up.

9. The detection device according to claim 8, wherein the predetermined angular range is 45°, and
the optical sensors in the partial areas are configured to sequentially operate such that the partial area where the detection operation is performed is shifted in steps of 45°.

10. The detection device according to claim 9, wherein the subject of detection is a finger or a wrist of a human,
a pulse rate is measured a plurality of times for each of the partial areas based on a light-dark pattern of blood vessels included in the subject of detection, and
a measurement result of the pulse rate in the partial area is employed that meets a predetermined condition about variation in results of the measurement of the pulse rate performed a plurality of times.

11. The detection device according to claim 10, wherein the predetermined condition is that a standard deviation of the results of the measurement of the pulse rate performed a plurality of times is the smallest.

12. The detection device according to claim 10, wherein the predetermined condition is that a mean value is calculated that is closest to the mean value of the results of the measurement of the pulse rate in all the partial regions.

13. The detection device according to claim 10, wherein the predetermined condition is that a difference between maximum and minimum values of the results of the measurement of the pulse rate performed a plurality of times is the smallest.

14. A detection device comprising:
an annular substrate;
optical sensors annularly arranged along the substrate; and
a plurality of light sources annularly arranged correspondingly to the arrangement of the optical sensors, wherein each of the light sources comprises:
   a first light source configured to emit red light; and
   a second light source configured to emit green light,
a plurality of the first light sources and a plurality of the second light sources are alternately arranged in a ring shape,
detection is configured to be performed using at least one of:
   a transmissive detection method in which light of any one of the light sources is transmitted through a subject of detection located inside the annularly arranged optical sensors, and one of the optical sensors in a position facing the light source emitting the light with the subject of detection interposed therebetween performs the detection, and
   a reflective detection method in which light from any one of the light sources is reflected by the subject of detection and is detected by one of the optical sensors in a position corresponding to a location of the light source that emits light,
the first light sources are configured to be lit up in the transmissive detection method,
a detection area in which the optical sensors are arranged forms a circular ring,
the optical sensors are provided so as to be capable of individually performing a detection operation for each of a plurality of partial areas obtained by dividing a circumference formed by the circular ring into circular arcs each in a predetermined angular range,
each of the light sources is provided on a lateral side of a corresponding partial area of the partial areas, and
the light source, provided in a partial area facing the partial area where the detection operation is performed with the subject of detection interposed therebetween, is configured to be lit up.

15. A detection device comprising:
an annular substrate;
optical sensors annularly arranged along the substrate; and
a plurality of light sources annularly arranged correspondingly to the arrangement of the optical sensors, wherein
a detection area in which the optical sensors are arranged forms a circular ring,
the optical sensors are provided so as to be capable of individually performing a detection operation for each of a plurality of partial areas obtained by dividing a circumference formed by the circular ring into circular arcs each in a predetermined angular range,
each of the light sources is provided on a lateral side of a corresponding partial area of the partial areas, and
the light source, at a location corresponding to the partial area where the detection operation is performed, is configured to be lit up.

16. A detection device comprising:
an annular substrate;
optical sensors annularly arranged along the substrate; and
a plurality of light sources annularly arranged correspondingly to the arrangement of the optical sensors, wherein
a detection area in which the optical sensors are arranged forms a circular ring, the optical sensors are provided so as to be capable of individually performing a detection operation for each of a plurality of partial areas obtained by dividing a circumference formed by the circular ring into circular arcs each in a predetermined angular range, each of the light sources is provided on a lateral side of a corresponding partial area of the partial areas, and the light source, provided in a partial area facing the partial area where the detection operation is performed with the subject of detection interposed therebetween, is configured to be lit up.

\* \* \* \* \*